US012519924B2

(12) United States Patent
Vaish et al.

(10) Patent No.: US 12,519,924 B2
(45) Date of Patent: Jan. 6, 2026

(54) MULTI-PERSPECTIVE AUGMENTED REALITY EXPERIENCE

(71) Applicant: Snap Inc., Santa Monica, CA (US)

(72) Inventors: Rajan Vaish, Beverly Hills, CA (US); Sven Kratz, Mercer Island, WA (US); Andrés Monroy-Hernández, Princeton, NJ (US); Brian Anthony Smith, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/900,200

(22) Filed: Aug. 31, 2022

(65) Prior Publication Data
US 2024/0073402 A1 Feb. 29, 2024

(51) Int. Cl.
H04N 13/368 (2018.01)
G06T 19/00 (2011.01)
(Continued)

(52) U.S. Cl.
CPC ......... *H04N 13/368* (2018.05); *G06T 19/006* (2013.01); *H04N 13/117* (2018.05); *H04N 13/158* (2018.05); *H04N 13/189* (2018.05); *H04N 13/388* (2018.05); *G06T 2219/024* (2013.01)

(58) Field of Classification Search
CPC .. H04N 13/368; H04N 13/189; H04N 13/117; H04N 13/158; H04N 13/388; G06T 19/006; G06T 2219/024
See application file for complete search history.

(56) References Cited

U.S. PATENT DOCUMENTS 4,807,158 A 2/1989 Blanton et al.
6,038,295 A 3/2000 Mattes
(Continued)

FOREIGN PATENT DOCUMENTS

CA 2887596 7/2015
CN CN-105912129 A 8/2016
(Continued)

OTHER PUBLICATIONS

US 10,656,660 B1, 05/2020, Meisenholder et al. (withdrawn)
(Continued)

*Primary Examiner* — Charles L Beard
(74) *Attorney, Agent, or Firm* — Schwegman Lundberg & Woessner, P.A.

(57) ABSTRACT

A volumetric video of a three-dimensional space is captured. The volumetric video of the three-dimensional space includes a volumetric representation of a first user within the three-dimensional space. The volumetric video is displayed by a display device worn by a second user, and the second user sees the volumetric representation of the first user within the three-dimensional space. Input indicative of an interaction (e.g., entering or leaving) of the second user with the volumetric representation of the first user is detected. Based on detecting the input indicative of the interaction, the display device switches to a display of a recorded perspective of the first user. Thus, by interacting with a volumetric representation of the first user in a volumetric video, the second user views the first user's perspective of the three-dimensional space.

20 Claims, 14 Drawing Sheets

(51) Int. Cl.
*H04N 13/106* (2018.01)
*H04N 13/117* (2018.01)
*H04N 13/189* (2018.01)
*H04N 13/388* (2018.01)

(56) References Cited

U.S. PATENT DOCUMENTS

| | | | |
|---|---|---|---|
| 6,430,997 B1 * | 8/2002 | French | A63F 13/45 |
| | | | 73/379.04 |
| 6,819,982 B2 | 11/2004 | Doane | |
| 6,980,909 B2 | 12/2005 | Root et al. | |
| 7,173,651 B1 | 2/2007 | Knowles | |
| 7,190,496 B2 | 3/2007 | Klug et al. | |
| 7,411,493 B2 | 8/2008 | Smith | |
| 7,535,890 B2 | 5/2009 | Rojas | |
| 7,542,073 B2 | 6/2009 | Li et al. | |
| 8,046,719 B2 * | 10/2011 | Skourup | G06F 3/011 |
| | | | 715/848 |
| 8,131,597 B2 | 3/2012 | Hudetz | |
| 8,174,562 B2 | 5/2012 | Hartman | |
| 8,199,747 B2 | 6/2012 | Rojas et al. | |
| 8,274,550 B2 | 9/2012 | Steuart, III | |
| 8,332,475 B2 | 12/2012 | Rosen et al. | |
| 8,608,563 B2 * | 12/2013 | Miyazaki | A63F 13/10 |
| | | | 463/31 |
| 8,646,720 B2 | 2/2014 | Shaw | |
| 8,718,333 B2 | 5/2014 | Wolf et al. | |
| 8,724,622 B2 | 5/2014 | Rojas | |
| 8,812,954 B2 * | 8/2014 | Shuster | G06T 19/20 |
| | | | 345/473 |
| 8,874,677 B2 | 10/2014 | Rosen et al. | |
| 8,909,679 B2 | 12/2014 | Root et al. | |
| 8,934,015 B1 | 1/2015 | Chi et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,186,548 B2 * | 11/2015 | House | G11B 27/13 |
| 9,191,776 B2 | 11/2015 | Root et al. | |
| 9,204,252 B2 | 12/2015 | Root | |
| 9,235,932 B2 | 1/2016 | Choi et al. | |
| 9,294,757 B1 * | 3/2016 | Lewis | G06F 3/038 |
| 9,344,642 B2 | 5/2016 | Niemi et al. | |
| 9,345,711 B2 | 5/2016 | Friedhoff | |
| 9,443,227 B2 | 9/2016 | Evans et al. | |
| 9,445,081 B1 * | 9/2016 | Kouperman | G06T 15/00 |
| 9,471,059 B1 | 10/2016 | Wilkins | |
| 9,489,661 B2 | 11/2016 | Evans et al. | |
| 9,489,937 B1 | 11/2016 | Beard et al. | |
| 9,491,134 B2 | 11/2016 | Rosen et al. | |
| 9,551,873 B2 * | 1/2017 | Zalewski | G06T 15/00 |
| 9,576,369 B2 | 2/2017 | Venkataraman et al. | |
| 9,582,166 B2 | 2/2017 | Vaittinen et al. | |
| 9,586,147 B2 | 3/2017 | Bathiche et al. | |
| 9,586,166 B2 | 3/2017 | Coulonvaux et al. | |
| 9,589,448 B1 | 3/2017 | Schneider et al. | |
| 9,681,046 B2 | 6/2017 | Adsumilli et al. | |
| 9,703,369 B1 * | 7/2017 | Mullen | G06F 3/01 |
| 9,723,272 B2 | 8/2017 | Lu et al. | |
| 9,747,901 B1 | 8/2017 | Gentry | |
| 9,761,057 B2 | 9/2017 | Salter et al. | |
| 9,779,538 B2 * | 10/2017 | Sanders | G06F 3/011 |
| 9,794,527 B1 | 10/2017 | Balez et al. | |
| 9,818,225 B2 * | 11/2017 | Mao | A63F 13/825 |
| 9,916,673 B2 | 3/2018 | Castro et al. | |
| 9,922,659 B2 | 3/2018 | Bradlow et al. | |
| 9,989,965 B2 | 6/2018 | Cuban et al. | |
| 10,061,328 B2 | 8/2018 | Canoy et al. | |
| 10,109,224 B1 | 10/2018 | Ratti et al. | |
| 10,140,987 B2 | 11/2018 | Erickson et al. | |
| 10,168,700 B2 | 1/2019 | Gordon et al. | |
| 10,282,903 B1 * | 5/2019 | Clark | G02B 27/017 |
| 10,289,193 B2 * | 5/2019 | Hardy | G06F 3/011 |
| 10,313,481 B2 * | 6/2019 | Kada | G06T 15/10 |
| 10,325,410 B1 * | 6/2019 | Smith | G06T 11/00 |
| 10,365,784 B2 * | 7/2019 | Inomata | G06F 3/04815 |
| 10,370,118 B1 | 8/2019 | Nielsen et al. | |
| 10,403,050 B1 * | 9/2019 | Beall | G06T 7/292 |
| 10,445,925 B2 * | 10/2019 | Tokubo | G06F 3/0346 |
| 10,445,940 B2 * | 10/2019 | Guay | G06T 19/006 |
| 10,482,665 B2 | 11/2019 | Copic et al. | |
| 10,501,180 B2 | 12/2019 | Yu | |
| 10,504,277 B1 | 12/2019 | Haitani et al. | |
| 10,581,940 B1 * | 3/2020 | Iyer | G06F 3/147 |
| 10,616,663 B2 * | 4/2020 | Davisson | H04N 21/435 |
| 10,768,639 B1 | 9/2020 | Meisenholder et al. | |
| 10,768,776 B1 * | 9/2020 | Roche | H04N 7/157 |
| 10,796,489 B1 * | 10/2020 | Cordes | A63F 13/213 |
| 10,819,946 B1 | 10/2020 | Tanumihardja et al. | |
| 10,901,215 B1 * | 1/2021 | Newcombe | G02B 27/0172 |
| 10,921,878 B2 * | 2/2021 | Noris | G06F 3/011 |
| 10,937,239 B2 | 3/2021 | Huston et al. | |
| 11,006,095 B2 | 5/2021 | Holzer et al. | |
| 11,051,049 B2 * | 6/2021 | Bustamante | H04N 21/242 |
| 11,062,517 B2 * | 7/2021 | Crews | G06F 1/1694 |
| 11,094,127 B2 * | 8/2021 | McCall | A63F 13/92 |
| 11,126,206 B2 | 9/2021 | Meisenholder et al. | |
| 11,145,123 B1 | 10/2021 | Chor et al. | |
| 11,156,830 B2 * | 10/2021 | Johnson | G06T 19/006 |
| 11,163,358 B2 * | 11/2021 | Marks | G06F 3/013 |
| 11,194,439 B2 * | 12/2021 | Laaksonen | G06T 15/20 |
| 11,200,028 B2 * | 12/2021 | Newell | G06F 3/167 |
| 11,200,742 B1 * | 12/2021 | Post | G06T 19/003 |
| 11,302,077 B2 | 4/2022 | Kang et al. | |
| 11,361,473 B1 * | 6/2022 | Abdollahian | G06T 11/60 |
| 11,372,474 B2 * | 6/2022 | Schweet | G06F 3/014 |
| 11,413,514 B2 * | 8/2022 | Marty | A63B 69/0071 |
| 11,436,806 B1 * | 9/2022 | Katz | A61B 5/7425 |
| 11,468,605 B2 * | 10/2022 | Corson | G06F 3/0304 |
| 11,481,423 B1 | 10/2022 | Singleton | |
| 11,481,980 B2 * | 10/2022 | Yerli | G06F 3/011 |
| 11,495,004 B1 * | 11/2022 | Henry | G06T 19/006 |
| 11,521,359 B2 | 12/2022 | Noorkami et al. | |
| 11,559,746 B1 * | 1/2023 | Caballero | A63F 13/497 |
| 11,623,138 B2 * | 4/2023 | Yeh | A63F 13/28 |
| | | | 463/31 |
| 11,734,905 B1 * | 8/2023 | Henry | H04N 23/72 |
| | | | 345/633 |
| 11,769,299 B1 * | 9/2023 | Stehlik | G06T 7/50 |
| | | | 345/419 |
| 11,810,259 B2 | 11/2023 | Ramani et al. | |
| 11,847,749 B2 * | 12/2023 | Lebeaupin | G09B 29/106 |
| 11,861,799 B2 * | 1/2024 | Laaksonen | G06T 19/006 |
| 11,941,764 B2 | 3/2024 | Harding et al. | |
| 11,972,521 B2 | 4/2024 | Vaish et al. | |
| 12,109,494 B1 * | 10/2024 | Ives | A63F 13/573 |
| 12,145,058 B2 * | 11/2024 | Lehtiniemi | A63F 13/48 |
| 12,267,482 B2 | 4/2025 | Vaish et al. | |
| 12,282,604 B2 | 4/2025 | Vaish et al. | |
| 12,322,052 B2 | 6/2025 | Kratz et al. | |
| 12,449,891 B2 | 10/2025 | Vaish et al. | |
| 2001/0045780 A1 | 11/2001 | Gottlieb et al. | |
| 2004/0135890 A1 | 7/2004 | Kaneko et al. | |
| 2006/0287025 A1 * | 12/2006 | French | A63F 13/843 |
| | | | 463/4 |
| 2007/0167689 A1 | 7/2007 | Ramadas et al. | |
| 2007/0196809 A1 * | 8/2007 | Sen | A63F 13/10 |
| | | | 463/9 |
| 2007/0250526 A1 | 10/2007 | Hanna | |
| 2008/0081676 A1 | 4/2008 | Chakraborty et al. | |
| 2008/0158256 A1 | 7/2008 | Russell et al. | |
| 2008/0168411 A1 * | 7/2008 | Mang | G06F 30/3312 |
| | | | 716/134 |
| 2008/0186255 A1 | 8/2008 | Cohen et al. | |
| 2008/0211771 A1 * | 9/2008 | Richardson | A63F 13/52 |
| | | | 345/158 |
| 2008/0255842 A1 | 10/2008 | Simhi | |
| 2008/0262911 A1 * | 10/2008 | Altberg | G06Q 30/02 |
| | | | 715/757 |
| 2008/0263459 A1 * | 10/2008 | Altberg | H04L 51/046 |
| | | | 715/757 |

(56) References Cited

U.S. PATENT DOCUMENTS

| | | | |
|---|---|---|---|
| 2009/0112538 A1* | 4/2009 | Anderson | G06Q 10/06 703/6 |
| 2009/0122133 A1 | 5/2009 | Hartman | |
| 2009/0171902 A1 | 7/2009 | Maclaurin et al. | |
| 2009/0187389 A1* | 7/2009 | Dobbins | G06F 3/011 715/757 |
| 2009/0213114 A1* | 8/2009 | Dobbins | G06F 3/011 345/419 |
| 2010/0026809 A1 | 2/2010 | Curry | |
| 2010/0030660 A1* | 2/2010 | Edwards | G06Q 30/0601 705/26.1 |
| 2010/0060662 A1* | 3/2010 | Law | A63F 13/63 345/629 |
| 2010/0078016 A1 | 4/2010 | Jourdain et al. | |
| 2010/0125799 A1* | 5/2010 | Roberts | G06F 3/011 715/757 |
| 2010/0185984 A1 | 7/2010 | Wright et al. | |
| 2010/0260422 A1 | 10/2010 | Ito et al. | |
| 2011/0179313 A1 | 7/2011 | Macdonald et al. | |
| 2011/0202598 A1 | 8/2011 | Evans et al. | |
| 2011/0214082 A1 | 9/2011 | Osterhout et al. | |
| 2011/0242134 A1* | 10/2011 | Miller | G06F 3/017 345/633 |
| 2011/0261083 A1 | 10/2011 | Wilson | |
| 2012/0027278 A1 | 2/2012 | Chaney et al. | |
| 2012/0052947 A1* | 3/2012 | Yun | G09B 19/0038 463/32 |
| 2012/0131125 A1 | 5/2012 | Seidel et al. | |
| 2012/0188452 A1 | 7/2012 | Keiser et al. | |
| 2012/0194420 A1* | 8/2012 | Osterhout | G06F 3/013 345/156 |
| 2012/0209924 A1 | 8/2012 | Evans et al. | |
| 2012/0263154 A1 | 10/2012 | Blanchflower et al. | |
| 2012/0281885 A1 | 11/2012 | Syrdal et al. | |
| 2012/0287274 A1 | 11/2012 | Bevirt | |
| 2012/0320169 A1* | 12/2012 | Bathiche | G02B 27/017 348/53 |
| 2013/0056581 A1 | 3/2013 | Sparks | |
| 2013/0072296 A1* | 3/2013 | Miyazaki | A63F 13/10 463/31 |
| 2013/0083009 A1 | 4/2013 | Geisner et al. | |
| 2013/0083173 A1* | 4/2013 | Geisner | G06T 19/006 348/51 |
| 2013/0135315 A1* | 5/2013 | Bares | G11B 27/031 345/473 |
| 2013/0162632 A1 | 6/2013 | Varga et al. | |
| 2013/0238168 A1 | 9/2013 | Reyes | |
| 2014/0013228 A1 | 1/2014 | Hutten | |
| 2014/0038708 A1* | 2/2014 | Davison | A63F 13/69 463/31 |
| 2014/0058807 A1* | 2/2014 | Altberg | H04L 12/66 348/14.08 |
| 2014/0254896 A1 | 9/2014 | Zhou et al. | |
| 2014/0285522 A1 | 9/2014 | Kim et al. | |
| 2014/0357366 A1* | 12/2014 | Koganezawa | A63F 13/34 463/31 |
| 2014/0368542 A1 | 12/2014 | Tawara et al. | |
| 2015/0015486 A1* | 1/2015 | Osman | A63F 13/92 345/156 |
| 2015/0015608 A1 | 1/2015 | Park | |
| 2015/0016777 A1 | 1/2015 | Abovitz et al. | |
| 2015/0022432 A1 | 1/2015 | Stewart et al. | |
| 2015/0035862 A1* | 2/2015 | Fischer | H04N 23/90 345/633 |
| 2015/0070272 A1 | 3/2015 | Kim et al. | |
| 2015/0168497 A1 | 6/2015 | Tabatowski-Bush | |
| 2015/0175263 A1 | 6/2015 | Reyes | |
| 2015/0193979 A1* | 7/2015 | Grek | G06F 1/1694 345/633 |
| 2015/0199022 A1 | 7/2015 | Gottesman et al. | |
| 2015/0287246 A1 | 10/2015 | Huston et al. | |
| 2015/0331490 A1* | 11/2015 | Yamada | G06F 3/017 345/156 |
| 2015/0355711 A1* | 12/2015 | Rihn | G06F 3/04815 340/407.2 |
| 2015/0362917 A1 | 12/2015 | Wang et al. | |
| 2015/0363034 A1 | 12/2015 | Hinckley et al. | |
| 2016/0004390 A1 | 1/2016 | Laska et al. | |
| 2016/0027218 A1* | 1/2016 | Salter | G02B 27/0093 345/633 |
| 2016/0049003 A1* | 2/2016 | Shuster | A63F 13/355 386/230 |
| 2016/0063987 A1 | 3/2016 | Xu et al. | |
| 2016/0071548 A1* | 3/2016 | House | G11B 27/13 386/201 |
| 2016/0093108 A1* | 3/2016 | Mao | G02B 27/017 345/633 |
| 2016/0133230 A1 | 5/2016 | Daniels et al. | |
| 2016/0161946 A1 | 6/2016 | Wuth Sepulveda et al. | |
| 2016/0179096 A1 | 6/2016 | Bradlow et al. | |
| 2016/0217623 A1 | 7/2016 | Singh | |
| 2016/0292575 A1 | 10/2016 | Weast et al. | |
| 2016/0292886 A1 | 10/2016 | Erad et al. | |
| 2016/0307335 A1* | 10/2016 | Perry | G06T 7/292 |
| 2016/0307573 A1 | 10/2016 | Wobrock | |
| 2016/0330532 A1 | 11/2016 | Bostick et al. | |
| 2016/0336020 A1 | 11/2016 | Bradlow et al. | |
| 2016/0350973 A1* | 12/2016 | Shapira | G06F 3/011 |
| 2016/0357258 A1 | 12/2016 | Yeom et al. | |
| 2017/0031369 A1 | 2/2017 | Liu et al. | |
| 2017/0039765 A1* | 2/2017 | Zhou | G06T 7/521 |
| 2017/0061700 A1* | 3/2017 | Urbach | G02B 27/017 |
| 2017/0084051 A1 | 3/2017 | Weising et al. | |
| 2017/0094259 A1* | 3/2017 | Kouperman | H04N 13/111 |
| 2017/0099424 A1 | 4/2017 | Jones | |
| 2017/0102699 A1 | 4/2017 | Anderson | |
| 2017/0160815 A1* | 6/2017 | Glazier | G06F 3/017 |
| 2017/0177925 A1 | 6/2017 | Volkart | |
| 2017/0208103 A1 | 7/2017 | Sarmova | |
| 2017/0225796 A1 | 8/2017 | Sun et al. | |
| 2017/0228690 A1 | 8/2017 | Kohli | |
| 2017/0237940 A1* | 8/2017 | Chaney | H04N 7/142 348/14.07 |
| 2017/0244937 A1 | 8/2017 | Meier et al. | |
| 2017/0256040 A1 | 9/2017 | Grauer | |
| 2017/0266554 A1* | 9/2017 | Marks | A63F 13/5255 |
| 2017/0269685 A1* | 9/2017 | Marks | A63F 13/212 |
| 2017/0316606 A1* | 11/2017 | Khalid | G06T 17/00 |
| 2017/0318275 A1* | 11/2017 | Khalid | H04N 23/698 |
| 2017/0320564 A1 | 11/2017 | Kuzikov | |
| 2017/0323481 A1 | 11/2017 | Tran et al. | |
| 2017/0324841 A1* | 11/2017 | Clement | A63F 13/573 |
| 2017/0329488 A1* | 11/2017 | Welker | G06F 3/011 |
| 2017/0337791 A1 | 11/2017 | Gordon-carroll | |
| 2017/0359624 A1 | 12/2017 | Englert et al. | |
| 2017/0364153 A1* | 12/2017 | Kazansky | G06F 3/011 |
| 2017/0365098 A1 | 12/2017 | Auten et al. | |
| 2017/0365102 A1 | 12/2017 | Huston | A63F 13/65 |
| 2017/0371353 A1 | 12/2017 | Millinger, III | |
| 2018/0005429 A1* | 1/2018 | Osman | A63F 13/56 |
| 2018/0042559 A1 | 2/2018 | Cabrera, Jr. et al. | |
| 2018/0059783 A1 | 3/2018 | Van Hoff et al. | |
| 2018/0082682 A1 | 3/2018 | Erickson et al. | |
| 2018/0089842 A1* | 3/2018 | Mizuno | G06T 15/503 |
| 2018/0098059 A1 | 4/2018 | Valdivia et al. | |
| 2018/0130257 A1 | 5/2018 | Moran | |
| 2018/0152660 A1 | 5/2018 | Tanaka | H04N 5/60 |
| 2018/0154232 A1 | 6/2018 | Gentil | |
| 2018/0190033 A1 | 7/2018 | Barnett et al. | |
| 2018/0197324 A1* | 7/2018 | Hanamoto | G06T 7/70 |
| 2018/0246529 A1 | 8/2018 | Hu et al. | |
| 2018/0270427 A1 | 9/2018 | Damstra | H04N 21/21805 |
| 2018/0288364 A1 | 10/2018 | Virhiä | |
| 2018/0311585 A1* | 11/2018 | Osman | A63F 13/26 |
| 2018/0329486 A1* | 11/2018 | Williams | G02B 27/017 |
| 2018/0330515 A1* | 11/2018 | Stall | G06T 19/003 |
| 2018/0350146 A1* | 12/2018 | Gervasio | H04N 23/90 |
| 2018/0350147 A1* | 12/2018 | Lodato | H04N 13/282 |
| 2018/0350406 A1* | 12/2018 | Lodato | G11B 27/036 |
| 2019/0005546 A1 | 1/2019 | Chen et al. | |
| 2019/0005728 A1 | 1/2019 | Leppanen et al. | |
| 2019/0011921 A1 | 1/2019 | Wang et al. | |

(56) References Cited

U.S. PATENT DOCUMENTS

| | | | |
|---|---|---|---|
| 2019/0035097 A1* | 1/2019 | Smith | G06T 19/003 |
| 2019/0051046 A1 | 2/2019 | Jin et al. | |
| 2019/0054379 A1* | 2/2019 | Ackley | G06T 19/006 |
| 2019/0073831 A1* | 3/2019 | Kim | G06F 3/011 |
| 2019/0073832 A1* | 3/2019 | Kim | G06T 19/003 |
| 2019/0083885 A1* | 3/2019 | Yee | G06T 15/20 |
| 2019/0130599 A1* | 5/2019 | Gebbie | G06V 40/23 |
| 2019/0130631 A1* | 5/2019 | Gebbie | G06F 3/012 |
| 2019/0138260 A1 | 5/2019 | Rogers et al. | |
| 2019/0138463 A1 | 5/2019 | Kurata et al. | |
| 2019/0172265 A1* | 6/2019 | Cossairt | A63F 13/655 |
| 2019/0180509 A1* | 6/2019 | Laaksonen | G06F 3/04815 |
| 2019/0182471 A1* | 6/2019 | Khalid | H04N 13/122 |
| 2019/0188895 A1* | 6/2019 | Miller, IV | H04N 7/157 |
| 2019/0199993 A1* | 6/2019 | Babu J D | G06T 15/08 |
| 2019/0208189 A1* | 7/2019 | Lau | A63F 13/211 |
| 2019/0217189 A1* | 7/2019 | Gutierrez | A63F 13/30 |
| 2019/0262709 A1* | 8/2019 | Nakamura | A63F 13/428 |
| 2019/0278369 A1* | 9/2019 | Ballard | A63F 13/28 |
| 2019/0325654 A1 | 10/2019 | Stisser et al. | |
| 2019/0333261 A1* | 10/2019 | Nakashima | G06F 3/011 |
| 2019/0339768 A1* | 11/2019 | He | G06F 3/011 |
| 2019/0358547 A1* | 11/2019 | Mack | H04N 21/2187 |
| 2020/0020136 A1 | 1/2020 | Hwang et al. | |
| 2020/0042160 A1 | 2/2020 | Gabbi et al. | |
| 2020/0043235 A1* | 2/2020 | Chapman | G06T 19/006 |
| 2020/0051336 A1* | 2/2020 | Ichikawa | G06T 19/006 |
| 2020/0066043 A1* | 2/2020 | Graham | A63F 13/428 |
| 2020/0097077 A1* | 3/2020 | Nguyen | G05B 19/41885 |
| 2020/0098179 A1 | 3/2020 | Gough et al. | |
| 2020/0098191 A1 | 3/2020 | Mccall | |
| 2020/0101372 A1 | 4/2020 | Drake et al. | |
| 2020/0126257 A1* | 4/2020 | Tauber | G06T 7/75 |
| 2020/0126290 A1* | 4/2020 | Itakura | G06T 15/20 |
| 2020/0134911 A1 | 4/2020 | Van Hoff et al. | |
| 2020/0159361 A1 | 5/2020 | Rosenberg et al. | |
| 2020/0162779 A1 | 5/2020 | Saxena | |
| 2020/0169715 A1 | 5/2020 | Liu et al. | |
| 2020/0171394 A1 | 6/2020 | Khan et al. | |
| 2020/0230497 A1* | 7/2020 | Espinosa Baruque | G16H 20/40 |
| 2020/0236346 A1* | 7/2020 | Kato | H04N 13/349 |
| 2020/0241575 A1 | 7/2020 | Meisenholder et al. | |
| 2020/0242840 A1 | 7/2020 | Logan et al. | |
| 2020/0257367 A1 | 8/2020 | Rihn et al. | |
| 2020/0260149 A1 | 8/2020 | Ding et al. | |
| 2020/0264945 A1 | 8/2020 | Gangopadhyay et al. | |
| 2020/0273243 A1 | 8/2020 | Duffy et al. | |
| 2020/0279407 A1 | 9/2020 | Liljeroos et al. | |
| 2020/0289935 A1* | 9/2020 | Azmandian | G06F 3/04815 |
| 2020/0289941 A1* | 9/2020 | Khan | A63F 13/5255 |
| 2020/0314323 A1* | 10/2020 | van Geel | H04N 23/631 |
| 2020/0341541 A1* | 10/2020 | Olah-Reiken | G06F 3/011 |
| 2020/0349751 A1* | 11/2020 | Bentovim | G09B 5/06 |
| 2020/0366358 A1* | 11/2020 | Hanamoto | H04N 13/111 |
| 2020/0371737 A1* | 11/2020 | Leppänen | H04L 63/102 |
| 2020/0387288 A1* | 12/2020 | Ito | H04N 21/431 |
| 2020/0394012 A1 | 12/2020 | Wright, Jr. et al. | |
| 2020/0409451 A1 | 12/2020 | Mukherjea et al. | |
| 2021/0096543 A1 | 4/2021 | Stump et al. | |
| 2021/0142578 A1 | 5/2021 | Weinheimer et al. | |
| 2021/0159980 A1* | 5/2021 | Ben-Yehuda | H04N 7/181 |
| 2021/0232632 A1* | 7/2021 | Howard | G06N 3/08 |
| 2021/0272367 A1 | 9/2021 | Richter | |
| 2021/0279962 A1* | 9/2021 | Hutten | G06T 19/006 |
| 2021/0286179 A1* | 9/2021 | Miller, IV | G06F 3/013 |
| 2021/0287452 A1* | 9/2021 | Maruyama | G06F 3/167 |
| 2021/0289317 A1 | 9/2021 | Son et al. | |
| 2021/0312684 A1* | 10/2021 | Zimmermann | A63F 13/5255 |
| 2021/0327145 A1 | 10/2021 | Noorkami et al. | |
| 2021/0358294 A1* | 11/2021 | Parashar | G08C 17/02 |
| 2021/0362848 A1 | 11/2021 | Spencer | |
| 2021/0374579 A1 | 12/2021 | Dotan-cohen et al. | |
| 2021/0382503 A1 | 12/2021 | Meisenholder et al. | |
| 2021/0390953 A1* | 12/2021 | Makker | G06F 3/0304 |
| 2021/0394046 A1 | 12/2021 | Yen et al. | |
| 2021/0405772 A1 | 12/2021 | Canberk et al. | |
| 2021/0407178 A1 | 12/2021 | Zhou et al. | |
| 2021/0407208 A1* | 12/2021 | Hariton | G06F 3/0482 |
| 2021/0409502 A1 | 12/2021 | Chepizhenko et al. | |
| 2022/0014723 A1 | 1/2022 | Pandey et al. | |
| 2022/0028108 A1 | 1/2022 | Haapoja et al. | |
| 2022/0028170 A1 | 1/2022 | Haapoja et al. | |
| 2022/0044704 A1* | 2/2022 | Newell | H04N 21/816 |
| 2022/0051469 A1* | 2/2022 | Yoneda | H04N 13/117 |
| 2022/0053219 A1* | 2/2022 | Bathory | H04N 21/47815 |
| 2022/0101593 A1 | 3/2022 | Rockel et al. | |
| 2022/0103969 A1* | 3/2022 | Drummond | H04L 67/125 |
| 2022/0108539 A1 | 4/2022 | Nussbaum et al. | |
| 2022/0116581 A1* | 4/2022 | Miyata | H04N 23/60 |
| 2022/0124143 A1* | 4/2022 | Rafkind | H04L 65/403 |
| 2022/0139055 A1* | 5/2022 | Palmaro | A63F 13/245 345/419 |
| 2022/0141440 A1* | 5/2022 | Arai | H04N 21/21805 348/53 |
| 2022/0146833 A1* | 5/2022 | Miller, IV | G06F 3/013 |
| 2022/0164491 A1 | 5/2022 | Palmaro | |
| 2022/0189075 A1 | 6/2022 | Lynch et al. | |
| 2022/0197485 A1 | 6/2022 | Goodrich et al. | |
| 2022/0198603 A1 | 6/2022 | Goodrich et al. | |
| 2022/0230663 A1 | 7/2022 | Sun et al. | |
| 2022/0242450 A1 | 8/2022 | Sokolov et al. | |
| 2022/0244835 A1 | 8/2022 | Faulkner et al. | |
| 2022/0247929 A1 | 8/2022 | Yang et al. | |
| 2022/0269336 A1* | 8/2022 | Lafontaine | G06F 3/011 |
| 2022/0274026 A1* | 9/2022 | Steigelfest | A63F 13/86 |
| 2022/0277565 A1 | 9/2022 | Haro | |
| 2022/0345680 A1* | 10/2022 | Aoki | H04N 23/633 |
| 2022/0362631 A1* | 11/2022 | Hong | G16H 20/30 |
| 2022/0382255 A1 | 12/2022 | Lee | |
| 2022/0392169 A1* | 12/2022 | Simpson | A63F 13/211 |
| 2023/0009185 A1* | 1/2023 | Furukawa | H04N 13/194 |
| 2023/0010754 A1 | 1/2023 | Saxena | |
| 2023/0033201 A1* | 2/2023 | Ogasawara | G06T 15/205 |
| 2023/0063505 A1* | 3/2023 | Chastain | G06V 20/20 |
| 2023/0068042 A1* | 3/2023 | Lehrich | A63F 13/655 |
| 2023/0085590 A1* | 3/2023 | Tamura | H04N 21/4728 725/37 |
| 2023/0097571 A1* | 3/2023 | McCain | A63F 13/577 463/32 |
| 2023/0139337 A1* | 5/2023 | Noam | G06F 3/0231 345/156 |
| 2023/0173367 A1* | 6/2023 | Marty | A63B 24/0021 473/433 |
| 2023/0179641 A1* | 6/2023 | Bauer | H04L 67/146 709/227 |
| 2023/0214005 A1* | 7/2023 | Ohashi | G06F 3/011 345/156 |
| 2023/0214082 A1 | 7/2023 | Kang | |
| 2023/0224451 A1* | 7/2023 | Irie | G06T 15/20 348/51 |
| 2023/0237192 A1* | 7/2023 | Kahan | G01C 21/00 726/1 |
| 2023/0316681 A1* | 10/2023 | Dolev | G06T 7/20 345/156 |
| 2023/0334754 A1* | 10/2023 | Kirchmayer | G06T 17/00 |
| 2023/0341928 A1* | 10/2023 | Traynor | G06F 3/013 |
| 2023/0342989 A1* | 10/2023 | Lehtiniemi | G06T 11/00 |
| 2023/0360442 A1* | 11/2023 | Soryal | G08B 21/02 |
| 2023/0409114 A1 | 12/2023 | Sun et al. | |
| 2023/0412480 A1 | 12/2023 | Greyson et al. | |
| 2024/0005623 A1* | 1/2024 | Cooper | G06F 3/011 |
| 2024/0015274 A1* | 1/2024 | Aoki | H04N 13/111 |
| 2024/0020919 A1 | 1/2024 | Krueger | |
| 2024/0040106 A1* | 2/2024 | Yoneda | G06T 7/50 |
| 2024/0069626 A1* | 2/2024 | Vaish | G06T 19/003 |
| 2024/0069627 A1 | 2/2024 | Vaish et al. | |
| 2024/0069637 A1* | 2/2024 | Vaish | G06F 3/011 |
| 2024/0070969 A1 | 2/2024 | Vaish et al. | |
| 2024/0071004 A1* | 2/2024 | Vaish | G06F 16/2477 |
| 2024/0071006 A1* | 2/2024 | Kratz | G06N 3/044 |
| 2024/0071007 A1* | 2/2024 | Vaish | G06F 3/011 |
| 2024/0071008 A1* | 2/2024 | Vaish | G06V 20/64 |

(56) References Cited

U.S. PATENT DOCUMENTS

| | | | |
|---|---|---|---|
| 2024/0073404 A1* | 2/2024 | Vaish | H04N 13/167 |
| 2024/0078687 A1* | 3/2024 | Arai | G06T 19/00 |
| 2024/0119679 A1 | 4/2024 | Canberk et al. | |
| 2024/0119682 A1* | 4/2024 | Rudman | G06T 19/006 |
| 2024/0233224 A1 | 7/2024 | Fan et al. | |
| 2024/0242443 A1* | 7/2024 | Nallabolu | G06V 20/20 |
| 2024/0273832 A1* | 8/2024 | Newman | G06V 20/44 |
| 2024/0338899 A1* | 10/2024 | Watanabe | G06F 3/01 |
| 2024/0355069 A1* | 10/2024 | Lim | H04L 9/40 |
| 2024/0420439 A1* | 12/2024 | Yoneda | G06T 7/90 |
| 2024/0428455 A1* | 12/2024 | Onuma | G06T 7/75 |
| 2025/0037322 A1* | 1/2025 | Yoneda | H04N 23/90 |
| 2025/0184471 A1 | 6/2025 | Vaish et al. | |
| 2025/0211720 A1* | 6/2025 | Ichihashi | G06F 3/01 |
| 2025/0216951 A1* | 7/2025 | Lortie | G02B 27/017 |
| 2025/0252686 A1 | 8/2025 | Kratz et al. | |

FOREIGN PATENT DOCUMENTS

| | | |
|---|---|---|
| CN | 119836648 A | 4/2025 |
| JP | 2010061452 A | 3/2010 |
| KR | 20200014587 A | 2/2020 |
| KR | 20200109812 A | 9/2020 |
| KR | 20210065423 A | 6/2021 |
| KR | 20210135859 A | 11/2021 |
| KR | 20220064130 A | 5/2022 |
| WO | WO-2016105839 A1 | 6/2016 |
| WO | WO-2021002788 A1 | 1/2021 |
| WO | WO-2024049687 A1 | 3/2024 |
| WO | WO-2024049700 A1 | 3/2024 |
| WO | WO-2024050229 A1 | 3/2024 |
| WO | WO-2024050231 A1 | 3/2024 |
| WO | WO-2024050232 A1 | 3/2024 |
| WO | WO-2024050246 A1 | 3/2024 |
| WO | WO-2024050259 A1 | 3/2024 |
| WO | WO-2024050262 A1 | 3/2024 |
| WO | WO-2024050264 A1 | 3/2024 |

OTHER PUBLICATIONS

S. F. Langa, M. Montagud, G. Cernigliaro and D. R. Rivera, "Multiparty Holomeetings: Toward a New Era of Low-Cost Volumetric Holographic Meetings in Virtual Reality," in IEEE Access, vol. 10, pp. 81856-81876, 2022, doi: 10.1109/ACCESS.2022. 3196285. (Year: 2022).*

J. Ko, S. Lee, S. Kang and J. Lee, "Hybrid Camera Based Real-Time Human Body Segmentation for Virtual Reality E-learning System," 2011 First ACIS/JNU International Conference on Computers, Networks, Systems and Industrial Engineering, Jeju, Korea (South), 2011, pp. 116-118, doi: 10.1109/CNSI.2011.50. (Year: 2011).*

Yanbin Wang and Eng Tat Khoo, "Real-time stereoscopic rendering of realistic avatar for interactive 3D telepresence system," 2017 2nd International Conference on Image, Vision and Computing (ICIVC), Chengdu, 2017, pp. 577-581, doi: 10.1109/ICIVC.2017.7984621. (Year: 2017).*

S. A. Aseeri and V. Interrante, "The Influence of Avatar Representation and Behavior on Communication in Social Immersive Virtual Environments," 2018 IEEE Conference on Virtual Reality and 3D User Interfaces (VR), Tuebingen/Reutlingen, Germany, 2018, pp. 823-824, doi: 10.1109/VR.2018.8446261. (Year: 2018).*

Laput, Gierad, "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: URL: http: www.theregister.co.uk Dec. 12, 2005 stealthtext , (Dec. 12, 2005), 1 pg.

Meisenholder, David, "Remoteless Control of Drone Behavior", U.S. Appl. No. 15/640,143, filed Jun. 30, 2017, 108 pgs.

Pourmehr, Shokoofeh, "'You two! Take off!': Creating, Modifying, and Commanding Groups of Robots Using Face Engagement and Indirect Speech in Voice Commands", IEEE RSJ International Conference on Intelligent Robots and Systems (IROS), Tokyo, JP, (2013), 137-142.

Yamada, Wataru, "iSphere: Self-Luminous Spherical Drone Display", Proceedings of the 30th Annual ACM Symposium on User Interface Software and Technology (UIST), Quebec City, CA, (Oct. 22-25, 2017), 635-343.

"International Application Serial No. PCT/US2023/072557, International Search Report mailed Dec. 12, 2023", 3 pgs.

"International Application Serial No. PCT/US2023/072557, Written Opinion mailed Dec. 12, 2023", 4 pgs.

U.S. Appl. No. 17/900,407, filed Aug. 31, 2022, Controlling and Editing Presentation of Volumetric Content.

U.S. Appl. No. 17/900,436, filed Aug. 31, 2022, Contextual Memory Experience Triggers System.

U.S. Appl. No. 17/899,970 U.S. Pat. No. 11,972,521, filed Aug. 31, 2022, Multisensorial Presentation of Volumetric Content.

U.S. Appl. No. 18/056,142, filed Nov. 16, 2022, Touch-Based Augmented Reality Experience.

U.S. Appl. No. 18/058,175, filed Nov. 22, 2022, Mixing and Matching Volumetric Contents for New Augmented Reality Experiences.

U.S. Appl. No. 17/899,935, filed Aug. 31, 2022, Social Memory Re-Experiencing System.

U.S. Appl. No. 18/169,631, filed Feb. 15, 2023, Multi-Dimensional Experience Presentation Using Augmented Reality.

U.S. Appl. No. 17/900,354, filed Aug. 31, 2022, Timelapse Re-Experiencing System.

U.S. Appl. No. 18/170,271, filed Feb. 16, 2023, Generating Immersive Augmented Reality Experiences From Existing Images and Videos.

"U.S. Appl. No. 17/899,935, Non Final Office Action mailed Jun. 6, 2024", 13 pgs.

"U.S. Appl. No. 17/899,935, Response filed Oct. 7, 2024 to Non Final Office Action mailed Jun. 6, 2024", 11 pgs.

"U.S. Appl. No. 17/899,970, Corrected Notice of Allowability mailed Jan. 3, 2024", 5 pgs.

"U.S. Appl. No. 17/899,970, Non Final Office Action mailed Jul. 3, 2023", 22 pgs.

"U.S. Appl. No. 17/899,970, Notice of Allowance mailed Dec. 20, 2023", 9 pgs.

"U.S. Appl. No. 17/899,970, PTO Response to Rule 312 Communication mailed Mar. 27, 2024", 1 page.

"U.S. Appl. No. 17/899,970, Response filed Oct. 3, 2023 to Non Final Office Action mailed Jul. 3, 2023", 11 pgs.

"U.S. Appl. No. 17/899,970, Supplemental Notice of Allowability mailed Mar. 27, 2024", 2 pgs.

"U.S. Appl. No. 17/900,407, Advisory Action mailed Oct. 30, 2024", 3 pgs.

"U.S. Appl. No. 17/900,407, Examiner Interview Summary mailed Apr. 15, 2024", 2 pgs.

"U.S. Appl. No. 17/900,407, Final Office Action mailed Aug. 21, 2024", 14 pgs.

"U.S. Appl. No. 17/900,407, Non Final Office Action mailed Feb. 9, 2024", 11 pgs.

"U.S. Appl. No. 17/900,407, Notice of Allowance mailed Nov. 27, 2024", 8 pgs.

"U.S. Appl. No. 17/900,407, Response filed Apr. 23, 2024 to Non Final Office Action mailed Feb. 9, 2024", 12 pgs.

"U.S. Appl. No. 17/900,407, Response filed Oct. 18, 2024 to Final Office Action mailed Aug. 21, 2024", 12 pgs.

"U.S. Appl. No. 17/900,436, Non Final Office Action mailed Sep. 23, 2024", 12 pgs.

"U.S. Appl. No. 18/056,142, Corrected Notice of Allowability mailed Sep. 4, 2024", 2 pgs.

"U.S. Appl. No. 18/056,142, Examiner Interview Summary mailed Nov. 7, 2023", 2 pgs.

"U.S. Appl. No. 18/056,142, Final Office Action mailed Apr. 8, 2024", 15 pgs.

"U.S. Appl. No. 18/056,142, Non Final Office Action mailed Aug. 7, 2023", 12 pgs.

"U.S. Appl. No. 18/056,142, Notice of Allowance mailed Aug. 16, 2024", 9 pgs.

(56) References Cited

OTHER PUBLICATIONS

"U.S. Appl. No. 18/056,142, Notice of Non-Compliant Amendment mailed Nov. 16, 2023", 2 pgs.
"U.S. Appl. No. 18/056,142, Response filed Jan. 3, 2024 to Notice of Non-Compliant Amendment mailed Nov. 16, 2023", 11 pgs.
"U.S. Appl. No. 18/056,142, Response filed Jul. 8, 2024 to Final Office Action mailed Apr. 8, 2024", 13 pgs.
"U.S. Appl. No. 18/056,142, Response filed Nov. 7, 2023 to Non Final Office Action mailed Aug. 7, 2023", 11 pgs.
"U.S. Appl. No. 18/058,175, Examiner Interview Summary mailed Jun. 7, 2024", 2 pgs.
"U.S. Appl. No. 18/058,175, Final Office Action mailed Sep. 19, 2024", 12 pgs.
"U.S. Appl. No. 18/058,175, Non Final Office Action mailed Mar. 11, 2024", 14 pgs.
"U.S. Appl. No. 18/058,175, Notice of Allowance mailed Nov. 15, 2024", 8 pgs.
"U.S. Appl. No. 18/058,175, Response filed Jun. 11, 2024 to Non Final Office Action mailed Mar. 11, 2024", 11 pgs.
"U.S. Appl. No. 18/058,175, Response filed Oct. 30, 2024 to Final Office Action mailed Sep. 19, 2024", 9 pgs.
"U.S. Appl. No. 18/169,631, Non Final Office Action mailed Sep. 17, 2024", 28 pgs.
"U.S. Appl. No. 18/170,271, Non Final Office Action mailed Nov. 29, 2024", 11 pgs.
"U.S. Appl. No. 17/899,970, 312 Amendment filed Mar. 20, 2024", 7 pgs.
"International Application Serial No. PCT/US2023/030926, Written Opinion mailed Dec. 12, 2023", 4 pgs.
"International Application Serial No. PCT/US2023/031066,mailed Dec. 15, 2023", 3 pgs.
"International Application Serial No. PCT/US2023/031066, Written Opinion mailed Dec. 15, 2023", 3 pgs.
"International Application Serial No. PCT/US2023/072274, Written Opinion mailed Nov. 28, 2023", 4 pgs.
"International Application Serial No. PCT/US2023/072277, International Search Report mailed Dec. 8, 2023", 4 pgs.
"International Application Serial No. PCT/US2023/072277, Written Opinion mailed Dec. 8, 2023", 4 pgs.
"International Application Serial No. PCT/US2023/072282, International Search Report mailed Dec. 1, 2023", 4 pgs.
"International Application Serial No. PCT/US2023/072282, Written Opinion mailed Dec. 1 2023", 4 pgs.
"International Application Serial No. PCT/US2023/072568, International Search Report mailed Dec. 5, 2023", 3 pgs.
"International Application Serial No. PCT/US2023/072568, Written Opinion mailed Dec. 5, 2023", 4 pgs.
"International Application Serial No. PCT/US2023/072701,mailed Dec. 1, 2023", 3 pgs.
"International Application Serial No. PCT/US2023/072701, Written Opinion mailed Dec. 1, 2023", 4 pgs.
"International Application Serial No. PCT/US2023/072718, International Search Report mailed Dec. 1, 2023", 3 pgs.
"International Application Serial No. PCT/US2023/072718, Written Opinion mailed Dec. 1, 2023", 4 pgs.
"International Application Serial No. PCT/US2023/072726, International Search Report mailed Dec. 12, 2023", 3 pgs.
"International Application Serial No. PCT/US2023/072726, Written Opinion mailed Dec. 12, 2023", 4 pgs.
"U.S. Appl. No. 18/056,142, Notice of Allowance mailed Dec. 11, 2024", 5 pgs.
"U.S. Appl. No. 17/900,354, Non Final Office Action mailed Dec. 12, 2024", 17 pgs.
"U.S. Appl. No. 18/169,631, Response filed Dec. 17, 2024 to Non Final Office Action mailed Sep. 17, 2024", 11 pgs.
"U.S. Appl. No. 17/900,436, Response filed Dec. 20, 2024 to Non Final Office Action mailed Sep. 23, 2024", 12 pgs.
"U.S. Appl. No. 18/056,142, Notice of Allowability mailed Dec. 31, 2024", 2 pgs.
"U.S. Appl. No. 17/900,436, Examiner Interview Summary mailed Jan. 3, 2025", 2 pgs.
"U.S. Appl. No. 18/170,271, Response filed Jan. 6, 2025 to Non Final Office Action mailed Nov. 29, 2024", 10 pgs.
"U.S. Appl. No. 17/899,935, Final Office Action mailed Jan. 10, 2025", 13 pgs.
"U.S. Appl. No. 18/058,175, Notice of Allowance mailed Jan. 30, 2025", 8 pgs.
"U.S. Appl. No. 18/170,271, Notice of Allowance mailed Feb. 4, 2025", 7 pgs.
"U.S. Appl. No. 17/899,935, Non Final Office Action mailed Apr. 17, 2025", 14 pgs.
"U.S. Appl. No. 17/899,935, Response filed Apr. 9, 2025 to Final Office Action mailed Jan. 10, 2025", 10 pgs.
"U.S. Appl. No. 17/899,935, Response filed Jul. 16, 2025 to Non Final Office Action mailed Apr. 17, 2025", 13 pgs.
"U.S. Appl. No. 17/900,354, Corrected Notice of Allowability mailed Jul. 2, 2025", 2 pgs.
"U.S. Appl. No. 17/900,354, Notice of Allowance mailed Jun. 24, 2025", 9 pgs.
"U.S. Appl. No. 17/900,354, Response filed Mar. 12, 2025 to Non Final Office Action mailed Dec. 12, 2024", 10 pgs.
"U.S. Appl. No. 17/900,436, Examiner Interview Summary mailed Jul. 16, 2025", 2 pgs.
"U.S. Appl. No. 17/900,436, Final Office Action mailed Apr. 10, 2025", 14 pgs.
"U.S. Appl. No. 17/900,436, Non Final Office Action mailed Jul. 29, 2025", 13 pgs.
"U.S. Appl. No. 17/900,436, Response filed Jul. 8, 2025 to Final Office Action mailed Apr. 10, 2025", 12 pgs.
"U.S. Appl. No. 18/056,142, Corrected Notice of Allowability mailed Mar. 12, 2025", 2 pgs.
"U.S. Appl. No. 18/056,142, Corrected Notice of Allowability mailed Mar. 26, 2025", 2 pgs.
"U.S. Appl. No. 18/058,175, Corrected Notice of Allowability mailed May 7, 2025", 4 pgs.
"U.S. Appl. No. 18/169,631, Final Office Action mailed Mar. 10, 2025", 28 pgs.
"U.S. Appl. No. 18/169,631, Non Final Office Action mailed Jul. 15, 2025", 18 pgs.
"U.S. Appl. No. 18/169,631, Response filed Jun. 10, 2025 to Final Office Action mailed Mar. 10, 2025", 13 pgs.
"U.S. Appl. No. 18/170,271, Notice of Allowance malled May 9, 2025", 7 pgs.
"International Application Serial No. PCT/US2023/072557, International Preliminary Report on Patentabillity mailed Mar. 13, 2025", 6 pgs.
"U.S. Appl. No. 17/899,935, Non Final Office Action mailed Nov. 19, 2025", 16 pgs.
"U.S. Appl. No. 17/899,935, Final Office Action mailed Aug. 27, 2025", 16 pgs.
"U.S. Appl. No. 18/169,631, Response filed Oct. 15, 2025 to Non Final Office Action mailed Jul. 15, 2025", 13 pgs.
"U.S. Appl. No. 17/899,935, Examiner Interview Summary mailed Oct. 20, 2025", 2 pgs.
"U.S. Appl. No. 17/900,436, Response filed Oct. 22, 2025 to Non Final Office Action mailed Jul. 29, 2025", 10 pgs.
"U.S. Appl. No. 17/899,935, Response filed Oct. 24, 2025 to Final Office Action mailed Aug. 27, 2025", 13 pgs.
"U.S. Appl. No. 17/899,935, Advisory Action mailed Oct. 30, 2025", 3 pgs.

* cited by examiner

_US 12,519,924 B2_

MULTI-PERSPECTIVE AUGMENTED REALITY EXPERIENCE

TECHNICAL FIELD

The present disclosure generally relates to mobile and wearable computing technology. In particular, example embodiments of the present disclosure address systems, methods, and user interfaces for providing a multi-perspective augmented reality (AR) experience that allows users to enter and exist volumetric representations of human bodies.

BACKGROUND

An augmented reality (AR) experience includes application of virtual content to a real-world environment whether through presentation of the virtual content by transparent displays through which a real-world environment is visible or through augmenting image data to include the virtual content overlaid on real-world environments depicted therein. The virtual content can comprise one or more AR content items. An AR content item may include audio content, visual content or a visual effect. A device that supports AR experiences in any one of these approaches is referred to herein as an "AR device."

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
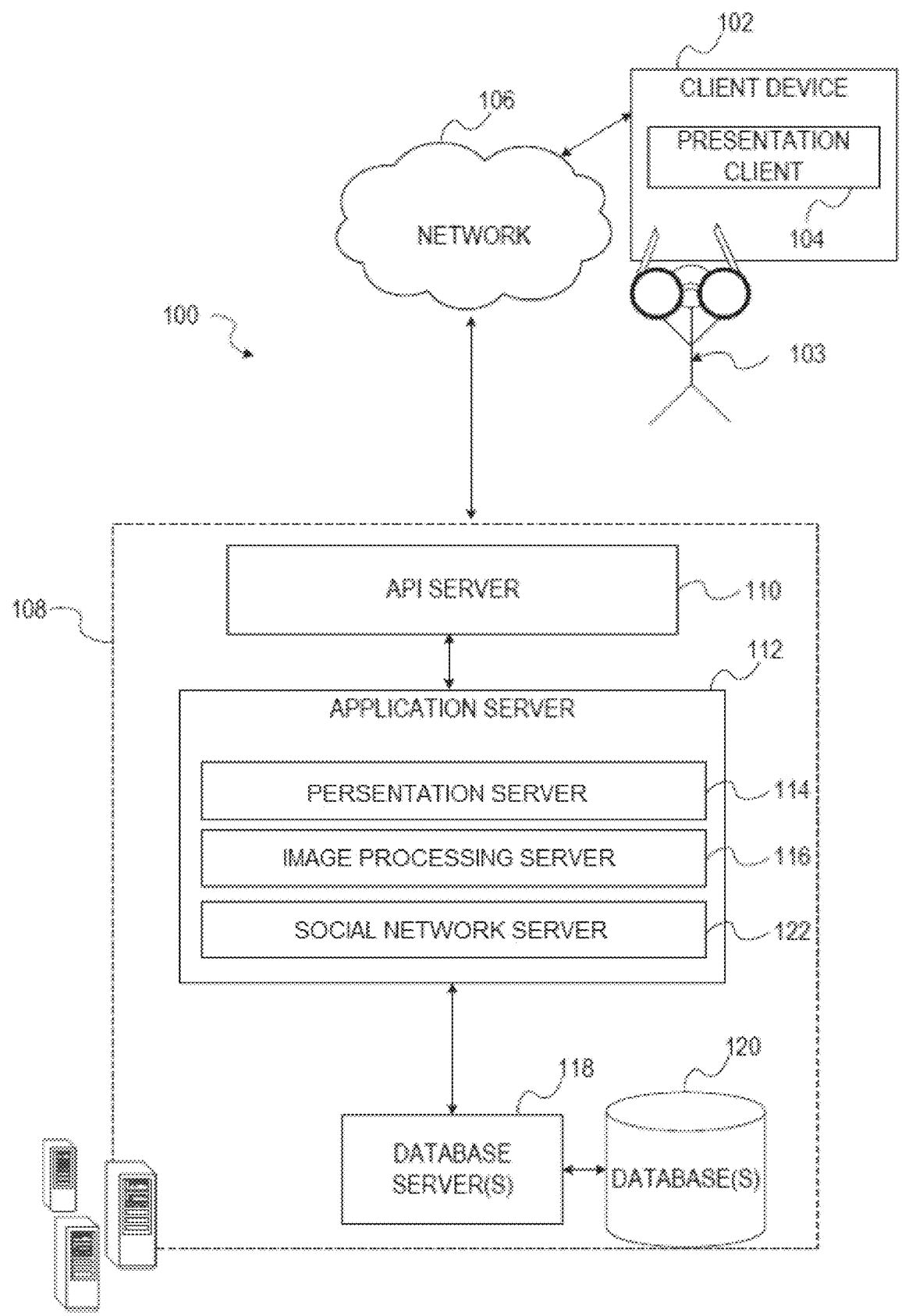
FIG. 1 is a diagrammatic representation of a networked environment in which a volumetric content presentation system may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Volumetric content is an example of an augmented reality (AR) experience. Volumetric content can include volumetric videos and images of three-dimensional spaces captured in three-dimensions (as well as audio signals recorded with volumetric videos and images). Recording of volumetric content includes volumetrically capturing elements of the three-dimensional space such as objects and human beings using a combination of cameras and sensors. Volumetric content includes a volumetric representation of one or more three-dimensional elements (e.g., an object or a person) of a three-dimensional space. A volumetric representation of an element (e.g., an AR content item) refers to a visual representation of the three-dimensional element in three-dimensions. The presentation of the volumetric content may include displaying one or more AR content items overlaid upon a real-world space, which may be the same as the three-dimensional space in which the volumetric video was captured or a different space. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. In this manner, the presentation of volumetric content provides an immersive AR experience to users.

Conventional volumetric content systems use a volumetric recorder (either a camera or a sensor) to capture the volumetric content. Although the volumetric content may include a volumetric representation of one or more three-dimensional elements (e.g., one or more persons) of a three-dimensional scene, presentation of the volumetric content by conventional volumetric presentation is typically limited to a single perspective. Aspects of the present disclosure include systems, methods, techniques, instruction sequences, and computer programs to provide an AR experience in which multiple perspectives of a three-dimensional scene can be presented to a user of the volumetric content system. The presentations of the multiple perspectives can be triggered when the user interacts with (e.g., enters) volumetric representations of people during presentation of the volumetric content.

In an example of the foregoing, volumetric content corresponding to a basketball game is presented. The volumetric content includes volumetric representations (e.g., AR content items) of elements of the basketball game, such as a basketball, players, a score board, a hoop, and the like. The volumetric content may also include perspectives of players of the basketball game. During the presentation of the volumetric content, a user may enter a volumetric representation of a player to view the player's perspective during the basketball game. The display may include playing a video of the player's recorded perspective on the user's display device or using AR or virtual reality (VR) technology to overlay the real-life items (e.g., score board, hoop) with the recorded perspective of the player.

The volumetric content, including the players' perspectives, may be stored in a shared platform. An authorized person (or any person) may access (e.g., download or stream) the volumetric content from the shared platform and view the players' perspectives by entering the players' volumetric representation. Two users may view the perspectives of the players together and share the perspectives they viewed with each other or with any other person. With reference back to the example mentioned above, the two users may be the players of the basketball game. In such case, present disclosure provides a way for the two players to relieve their memory of the basketball game.

Some illustrative examples of the foregoing include determining that a real-life volumetric body of a second user enters a volumetric representation of a first user. The determination is made based on multiple conditions, including any or all of the following three conditions:

1. The real-life volumetric body of the second user at least partially overlaps with the volumetric representation of the first user;
2. The real-life volumetric body of the second user is within a predefined distance of the volumetric representation of the first user; and
3. A gaze of the second user is directed at the volumetric representation of the first user.

It should be noted that these conditions are merely exemplary and shall not be limiting. Other similar or different conditions may be used in making the determination.

FIG. 1 is a block diagram showing an example volumetric content presentation system 100 for presenting volumetric content. The volumetric content presentation system 100 includes of a client device 102. The client device 102 hosts a number of applications including a presentation client 104. Each presentation client 104 is communicatively coupled to a presentation server system 108 via a network 106 (e.g., the Internet). In an example, the client device 102 is a wearable device (e.g., smart glasses) worn by the user 103 that includes a camera and optical elements that include a transparent display through which the real-world environment is visible to the user 103.

A presentation client 104 is able to communicate and exchange data with another presentation client 104 and with the presentation server system 108 via the network 106. The data exchanged between the presentation client 104, and between another presentation client 104 and the presentation server system 108, includes functions (e.g., commands to invoke functions) as well as payload data (e.g., text, audio, video, or other multimedia data).

The presentation server system 108 provides server-side functionality via the network 106 to a particular presentation client 104. While certain functions of the volumetric content presentation system 100 are described herein as being performed by either a presentation client 104 or by the presentation server system 108, the location of certain functionality either within the presentation client 104 or the presentation server system 108 is a design choice. For example, it may be technically preferable to initially deploy certain technology and functionality within the presentation server system 108, but to later migrate this technology and functionality to the presentation client 104 where the client device (102) has a sufficient processing capacity.

The presentation server system 108 supports various services and operations that are provided to the presentation client 104. Such operations include transmitting data to, receiving data from, and processing data generated by the presentation client 104. This data may include volumetric content (e.g., volumetric videos), message content, device information, geolocation information, media annotation and overlays, message content persistence conditions, social network information, and live event information, as examples. Data exchanges within the volumetric content presentation system 100 are invoked and controlled through functions available via user interfaces (UIs) and of the presentation client 104.

Turning now specifically to the presentation server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the API server 110 provides a set of interfaces (e.g., routines and protocols) that can be called or queried by the presentation client 104 in order to invoke functionality of the application server 112. The API server 110 exposes various functions supported by the application server 112, including account registration, login functionality, the sending of messages, via the application server 112, from a particular presentation client 104 to another presentation client 104, the sending of media files (e.g., volumetric videos) to the presentation client 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the presentation client 104).

The application server 112 hosts a number of applications and subsystems, including a presentation server 114, an image processing server 116 and a social network server 122. The presentation server 114 is generally responsible for managing volumetric content and facilitating presentation thereof by the client device 102. The image processing server 116 is dedicated to performing various image processing operations, typically with respect to images or video generated and displayed by the client device 102. The presentation server 114 and image processing server 116 may work in conjunction to provide one or more AR experiences to the user 103. For example, the presentation server 114 and image processing server 116 may work in conjunction to support presentation of volumetric content by the client device 102. Further details regarding presentation of volumetric content are discussed below.

The social network server 122 supports various social networking functions and services, and makes these functions and services available to the presentation server 114. To this end, the social network server 122 maintains and accesses an entity graph within the database 120. Examples of functions and services supported by the social network server 122 include the identification of other users of the volumetric content presentation system 100 with which a particular user has relationships or is "following", and also the identification of other entities and interests of a particular user.

The application server 112 is communicatively coupled to a database server 118, which facilitates access to a database 120 in which is stored data associated with content presented by the presentation server 114 and image processing server 116.

Figure 2A:
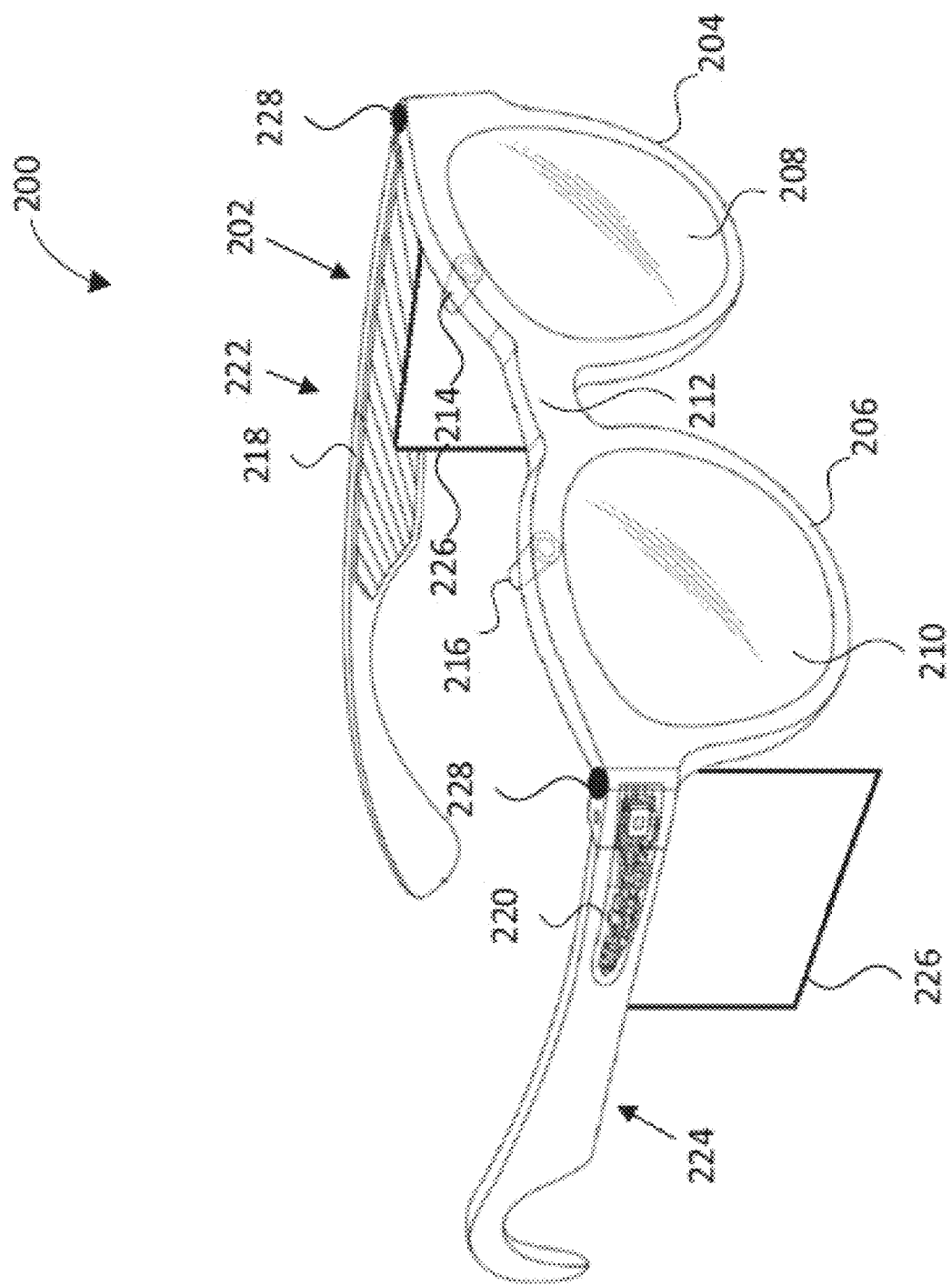
FIG. 2A is a perspective view of a head-worn device, in accordance with some example embodiments.

FIG. 2A is perspective view of a head-worn display device (e.g., glasses 200), in accordance with some examples. The glasses 200 are an example of the client device 102 of FIG. 1. The glasses 200 are capable of displaying content and are thus an example of a display device, which is referenced below. In addition, the display capabilities of the glasses 200 support AR experiences and the glasses 200 are thus an example of an AR device. As noted above, AR experiences include application of virtual content to real-world environments whether through presentation of the virtual content by transparent displays through which a real-world environment is visible or through augmenting image data to include the virtual content overlaid on real-world environments depicted therein.

The glasses 200 can include a frame 202 made from any suitable material such as plastic or metal, including any suitable shape memory alloy. In one or more examples, the frame 202 includes a first or left optical element holder 204 (e.g., a display or lens holder) and a second or right optical element holder 206 connected by a bridge 212. A first or left optical element 208 and a second or right optical element 210 can be provided within respective left optical element holder 204 and right optical element holder 206. The right optical element 210 and the left optical element 208 can be a lens, a display, a display assembly, or a combination of the foregoing. Any suitable display assembly can be provided in the glasses 200.

The frame 202 additionally includes a left arm or temple piece 222 and a right arm or temple piece 224. In some examples the frame 202 can be formed from a single piece of material so as to have a unitary or integral construction.

The glasses 200 can include a computing device, such as a computer 220, which can be of any suitable type so as to be carried by the frame 202 and, in one or more examples, of a suitable size and shape, so as to be partially disposed in one of the temple piece 222 or the temple piece 224. The computer 220 can include one or more processors with memory, wireless communication circuitry, and a power source. As discussed below, the computer 220 comprises low-power circuitry, high-speed circuitry, and a display processor. Various other examples may include these elements in different configurations or integrated together in different ways. Additional details of aspects of computer 220 may be implemented as illustrated by the data processor 302 discussed below.

The computer 220 additionally includes a battery 218 or other suitable portable power supply. In some examples, the battery 218 is disposed in left temple piece 222 and is electrically coupled to the computer 220 disposed in the right temple piece 224. The glasses 200 can include a connector or port (not shown) suitable for charging the battery 218, a wireless receiver, transmitter or transceiver (not shown), or a combination of such devices.

The glasses 200 include a first or left camera 214 and a second or right camera 216. Although two cameras are depicted, other examples contemplate the use of a single or additional (i.e., more than two) cameras. In one or more examples, the glasses 200 include any number of input sensors or other input/output devices in addition to the left camera 214 and the right camera 216. Such sensors or input/output devices can additionally include biometric sensors, location sensors, motion sensors, and so forth.

In some examples, the left camera 214 and the right camera 216 provide video frame data for use by the glasses 200 to extract 3D information from a real-world scene.

The glasses 200 may also include a touchpad 226 mounted to or integrated with one or both of the left temple piece 222 and right temple piece 224. The touchpad 226 is generally vertically-arranged, approximately parallel to a user's temple in some examples. As used herein, generally vertically aligned means that the touchpad is more vertical than horizontal, although potentially more vertical than that. Additional user input may be provided by one or more buttons 228, which in the illustrated examples are provided on the outer upper edges of the left optical element holder 204 and right optical element holder 206. The one or more touchpads 226 and buttons 228 provide a means whereby the glasses 200 can receive input from a user of the glasses 200.

Figure 2B:
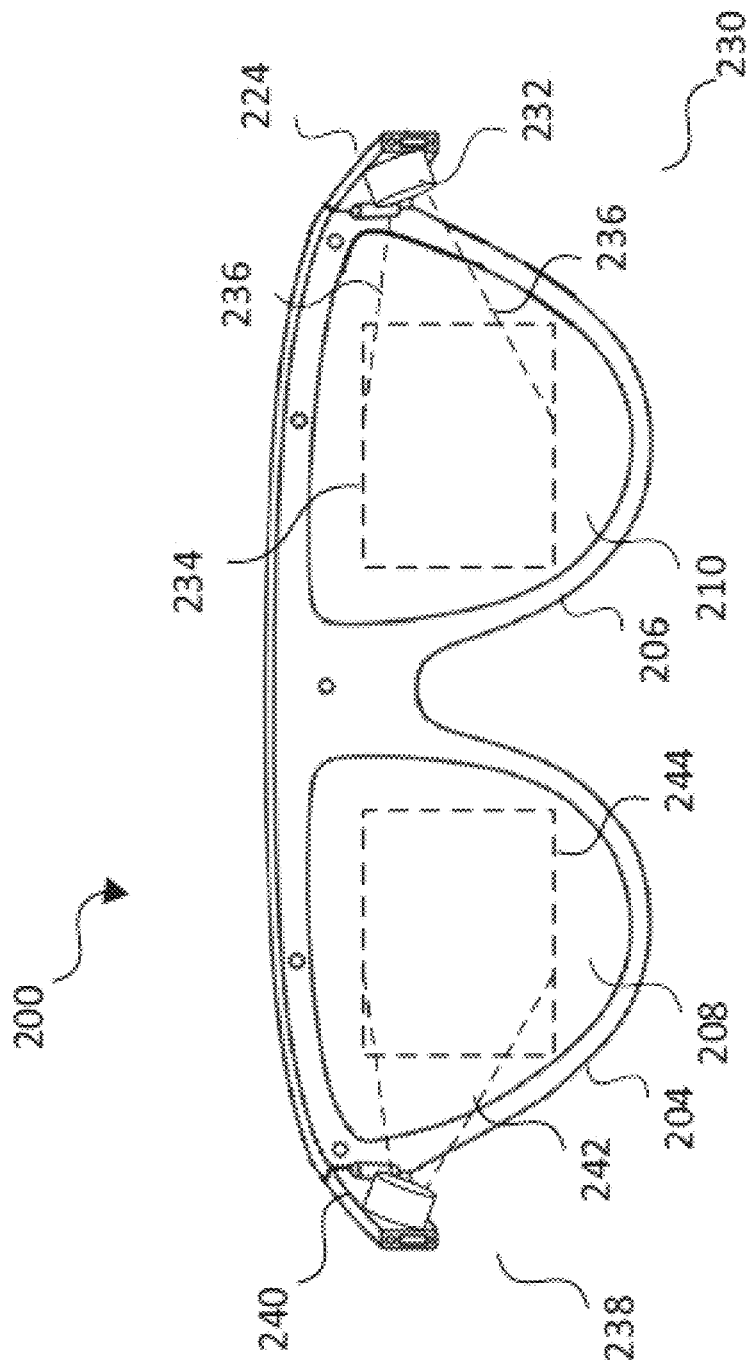
FIG. 2B illustrates a further view of the head-worn device of FIG. 2A, in accordance with some example embodiments.

FIG. 2B illustrates the glasses 200 from the perspective of a user. For clarity, a number of the elements shown in FIG. 2A have been omitted. As described in FIG. 2A, the glasses 200 shown in FIG. 2B include left optical element 208 and right optical element 210 secured within the left optical element holder 204 and the right optical element holder 206 respectively.

The glasses 200 include forward optical assembly 230 comprising a right projector 232 and a right near eye display 234, and a forward optical assembly 238 including a left projector 240 and a left near eye display 244.

In some examples, the near eye displays are waveguides. The waveguides include reflective or diffractive structures (e.g., gratings and/or optical elements such as mirrors, lenses, or prisms). Light 236 emitted by the projector 232 encounters the diffractive structures of the waveguide of the near eye display 234, which directs the light towards the right eye of a user to provide an image on or in the right optical element 210 that overlays the view of the real world seen by the user. Similarly, light 242 emitted by the projector 240 encounters the diffractive structures of the waveguide of the near eye display 244, which directs the light towards the left eye of a user to provide an image on or in the left optical element 208 that overlays the view of the real world seen by the user. The combination of a GPU, the forward optical assembly 230, the left optical element 208, and the right optical element 210 provide an optical engine of the glasses 200. The glasses 200 use the optical engine to generate an overlay of the real world view of the user including display of a 3D user interface to the user of the glasses 200.

It will be appreciated however that other display technologies or configurations may be utilized within an optical engine to display an image to a user in the user's field of view. For example, instead of a projector 232 and a waveguide, an LCD, LED or other display panel or surface may be provided.

In use, a user of the glasses 200 will be presented with information, content, and various 3D user interfaces on the near eye displays. As described in more detail herein, the user can then interact with the glasses 200 using a touchpad 226 and/or the buttons 228, voice inputs or touch inputs on an associated device (e.g., client device 328 illustrated in FIG. 3), and/or hand movements, locations, and positions detected by the glasses 200.

Figure 3:
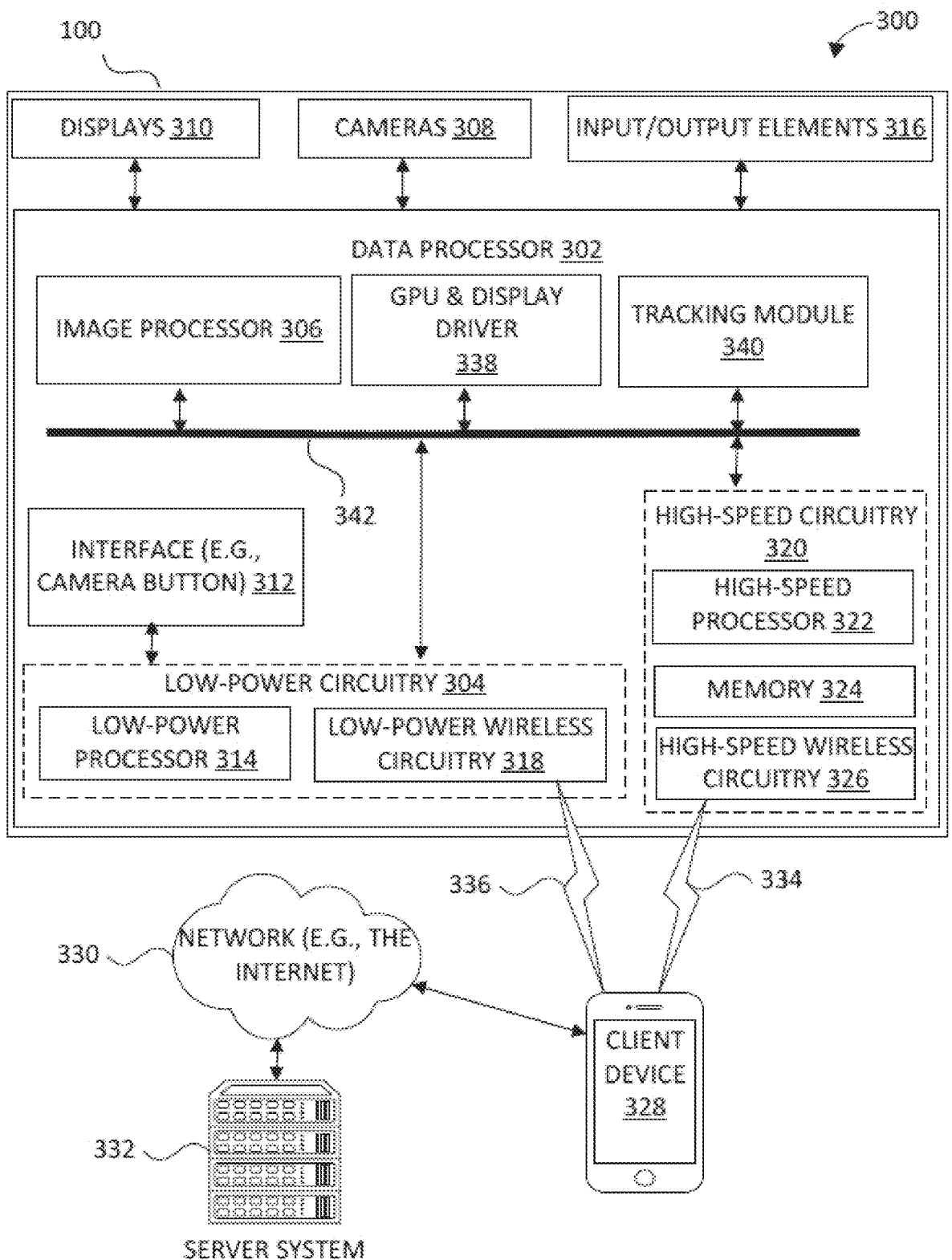
FIG. 3 is a block diagram illustrating a networked system including details of the head-worn device of FIG. 1, in accordance with some example embodiments.

FIG. 3 is a block diagram illustrating a networked system 300 including details of the glasses 200, in accordance with some examples. The networked system 300 includes the glasses 200, a client device 328, and a server system 332. The client device 328 may be a smartphone, tablet, phablet, laptop computer, access point, or any other such device capable of connecting with the glasses 200 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 906 or the machine 1000 described in FIG. 9 and FIG. 10 respectively.

The glasses 200 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 9 and FIG. 10. For example, the input/output elements 316 may include any of I/O components 818 including output components 826, motion components 834, and so forth. Examples of the displays 310 are discussed in FIG. 2B. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 200. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent standalone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 200. For example, the tracking module 340 uses image data and corresponding inertial data from the cameras 308 and the position components 838, as well as GPS data, to track a location and determine a pose of the glasses 200 relative to a frame of reference (e.g., real-world environment). The tracking module 340 continually gathers and uses updated sensor data describing movements of the glasses 200 to determine updated three-dimensional poses of the glasses 200 that indicate changes in the relative position and orientation relative to physical objects in the real-world environment. The tracking module 340 permits visual placement of virtual objects relative to physical objects by the glasses 200 within the field of view of the user via the displays 310.

The GPU & display driver 338 may use the pose of the glasses 200 to generate frames of virtual content or other content to be presented on the displays 310 when the glasses 200 are functioning in a traditional augmented reality mode. In this mode, the GPU & display driver 338 generates updated frames of virtual content based on updated three-dimensional poses of the glasses 200, which reflect changes in the position and orientation of the user in relation to physical objects in the user's real-world environment.

One or more functions or operations described herein may also be performed in an application resident on the glasses 200 or on the client device 328, or on a remote server. The glasses 200 may be a stand-alone client device that is capable of independent operation or may be a companion device that works with a primary device to offload intensive processing and/or exchange data over the network 106 with the presentation server system 108. The glasses 200 may also be communicatively coupled with a companion device such as a smart watch and may be configured to exchange data with the companion device. The glasses 200 may further include various components common to mobile electronic devices such as smart glasses or smart phones (for example, including a display controller for controlling display of visual media on a display mechanism incorporated in the device).

Figure 4:
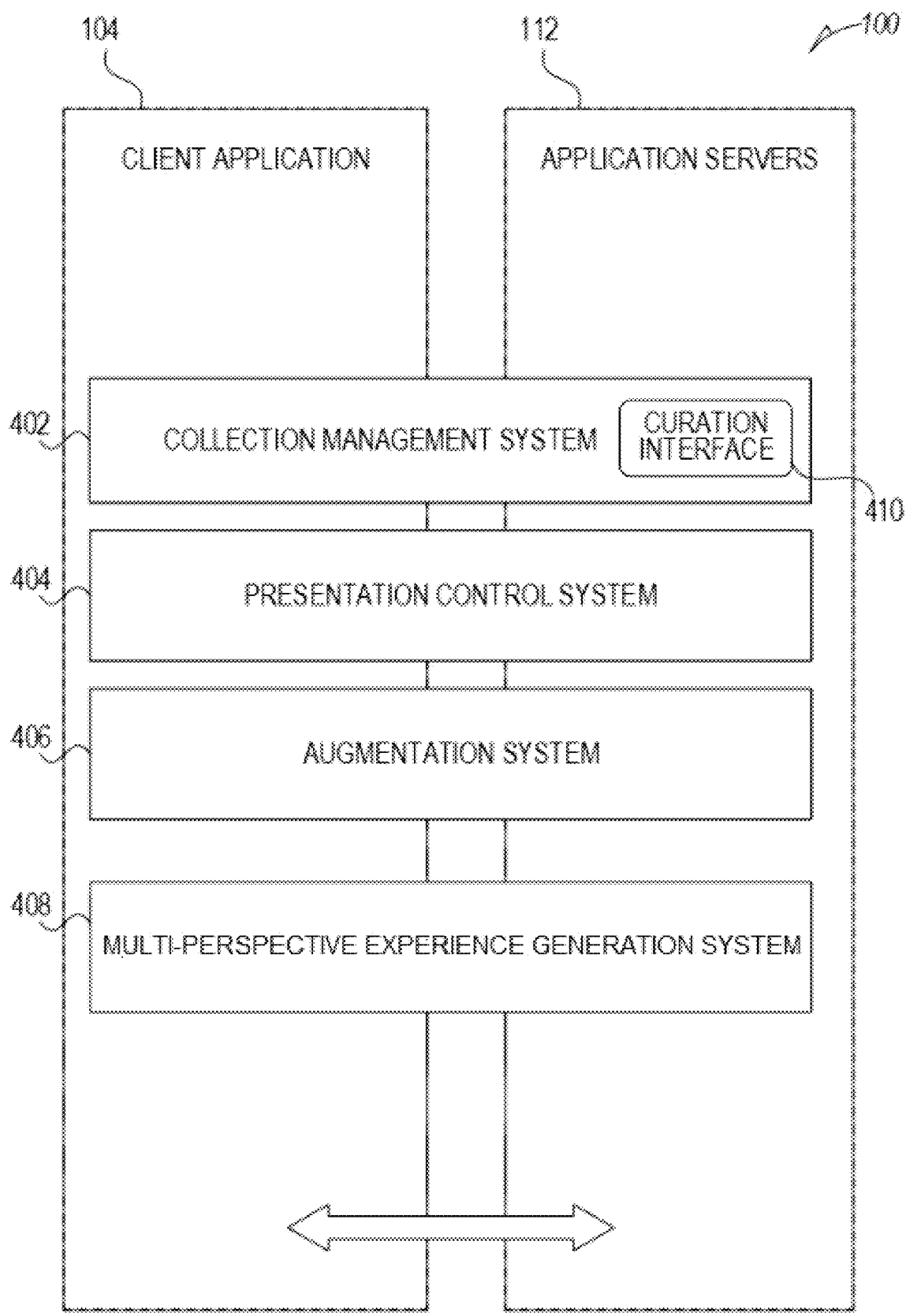
FIG. 4 is a diagrammatic representation of the volumetric content presentation system, in accordance with some examples, that has both client-side and server-side functionality.

FIG. 4 is a block diagram illustrating further details regarding the volumetric content presentation system 100, according to some examples. Specifically, the volumetric content presentation system 100 is shown to comprise the presentation client 104 and the application servers 110. The volumetric content presentation system 100 embodies a number of subsystems, which are supported on the client-side by the presentation client 104 and on the sever-side by the application servers 110. These subsystems include, for example, a collection management system 402, a presentation control system 404, an augmentation system 406, a multi-perspective experience generation system 408.

The collection management system 402 is responsible for managing sets or collections of content (e.g., collections of text, image, video, and audio data). A collection of content may be organized into an "event gallery" or an "event story." Such a collection may be made available for a specified time period, such as the duration of an event to which the content relates. For example, content relating to a music concert may be made available as a "story" for the duration of that music concert. The collection management system 402 may also be responsible for publishing an icon that provides notification of the existence of a particular collection to the user interface of the presentation client 104.

The collection management system 402 furthermore includes a curation interface 410 that allows a collection manager to manage and curate a particular collection of content. For example, the curation interface 410 enables an event organizer to curate a collection of content relating to a specific event (e.g., delete inappropriate content or redundant messages). Additionally, the collection management system 402 employs machine vision (or image recognition technology) and content rules to automatically curate a content collection.

The presentation control system 404 is responsible for facilitating and controlling volumetric content presentation. As such, the presentation control system 404 provides a mechanism that allows users to specify control operations for controlling volumetric content presentation. Control operations may, for example, include: a stop operation to stop the presentation; a pause operation to pause the presentation; a fast forward operation to advance the presentation at a higher speed; a rewind operation to rewind the presentation; a zoom-in operation to increase a zoom level of the presentation; a zoom-out operation to decrease the zoom level of the presentation; and a playback speed modification operation to change the speed of the presentation (e.g., to produce a slow motion presentation of the volumetric video).

For some embodiments, a user may specify input indicative of a control operation for controlling presentation of volumetric content by providing one or more inputs to via one or more I/O components (examples of which are described in further detail below in reference to FIG. 10). For some embodiments, the presentation control system 404 may provide an interactive control interface comprising one or more interactive elements (e.g., virtual buttons) to trigger a control operation and the presentation control system 404 monitors interaction with the interactive interface to detect input indicative of a control operation. For some embodiments, a user may trigger a control operation using a gesture such as a hand or head gesture that can be associated with a specific control operation.

The augmentation system 406 provides various functions that enable a user to augment (e.g., annotate or otherwise modify or edit) media content. For example, the augmentation system 406 provides functions related to the generation, publication, and application of augmentation data such as media overlays (e.g., image filters) to volumetric content. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The augmentation system 406 operatively supplies one or more media overlays to the presentation client 104 based on a geolocation of the client device 102 or based on other information, such as social network information of the user of the client device 102. The media overlays may be stored in the database 120 and accessed through the database server 118.

Filters are an example of media overlays that are displayed as overlaid on an image or video during presentation to a user. Filters may be of various types, including user-selected filters from a set of filters presented to a user by the presentation client 104. Other types of filters include geolocation filters (also known as geo-filters), which may be presented to a user based on geographic location. For example, geolocation filters specific to a neighborhood or special location may be presented within a user interface by the presentation client 104, based on geolocation information determined by a Global Positioning System (GPS) unit of the client device 102.

Another type of filter is a data filter, which may be selectively presented to a user by the presentation client 104, based on other inputs or information gathered by the client device 102. Examples of data filters include current temperature at a specific location, a current speed at which a sending user is traveling, battery life for a client device 102, or the current time.

AR content items are another example of media overlays. An AR content item may be a real-time special effect and/or sound that can be added to an image or a video including volumetric images and videos.

Generally, AR content items, overlays, image transformations, images, and similar terms refer to modifications that may be applied to image data (e.g., videos or images) including volumetric content. This includes real-time modifications, which modify an image as it is captured using device sensors (e.g., one or multiple cameras) of a client device 102 and then displayed by a display device of the client device 102 (e.g., an embedded display of the client device) with the modifications. This also includes modifications to stored content, such as volumetric videos in a gallery or collection that may be modified. For example, in a client device 102 with access to multiple AR content items, a user can use a single volumetric video with multiple AR content items to see how the different AR content items will modify the stored content. For example, multiple augmented reality content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such augmentation systems to modify content using augmentation data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, volumetric videos, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be augmented (e.g., edited), elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

The augmentation system 406 can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform video and image content can be used by the augmentation system 406 where a neural network operates as part of a presentation client 104 operating on the client device 102. The augmentation system 406 determines the presence of a face within the image or video stream and provides interactive modification elements (e.g., icons) associated with a computer animation model to transform image data, or the computer animation model can be present as associated with an interface described herein. The interactive modification elements include changes that may be the basis for modifying the user's face within the image or video content as part of the modification operation. Once a modification icon is selected, the transform system initiates a process to convert the image of the user to reflect the selected modification icon (e.g., generate a smiling face on the user). Modified image or video content may be presented in a graphical user interface displayed on the client device 102 as soon as the image or video stream is captured, and a specified modification is selected. The augmentation system 406 may implement a complex convolutional neural network on a portion of the image or video content to generate and apply the selected modification. That is, the user be presented with modified content in real-time or near real-time. Further, the modification may be persistent while the content is being presented. Machine taught neural networks may be used to enable such modifications.

The multi-perspective experience generation system 408 is responsible for providing a multi-perspective experience to a user. The multi-perspective experience generation system 408 can cause a presentation of a volumetric video by a user's display device. The presentation of the volumetric video may include a presentation of the volumetric representations of one or more people within a three-dimensional space. A perspective of each of one or more people may be pre-recorded by the multi-perspective experience generation system 408, or any other system(s) of the volumetric content presentation system 100. When the multi-perspective experience generation system 408 detects that the user interacts with (e.g., enters, leaves) the volumetric representations of a person of the one or more people within the three-dimensional space, the multi-perspective experience generation system 408 may cause the display device of the user to switch to a presentation of a perspective of the three-dimensional space corresponding to the person that the user interacts with. When the user enters/leaves the different volumetric representations of the one or more people, the multi-perspective experience generation system 408 causes the display device to switch between a presentation of the volumetric video and presentations of different perspectives, hence providing the user with an ability to experience multi-perspectives of different people in the three-dimensional space.

Figure 5:
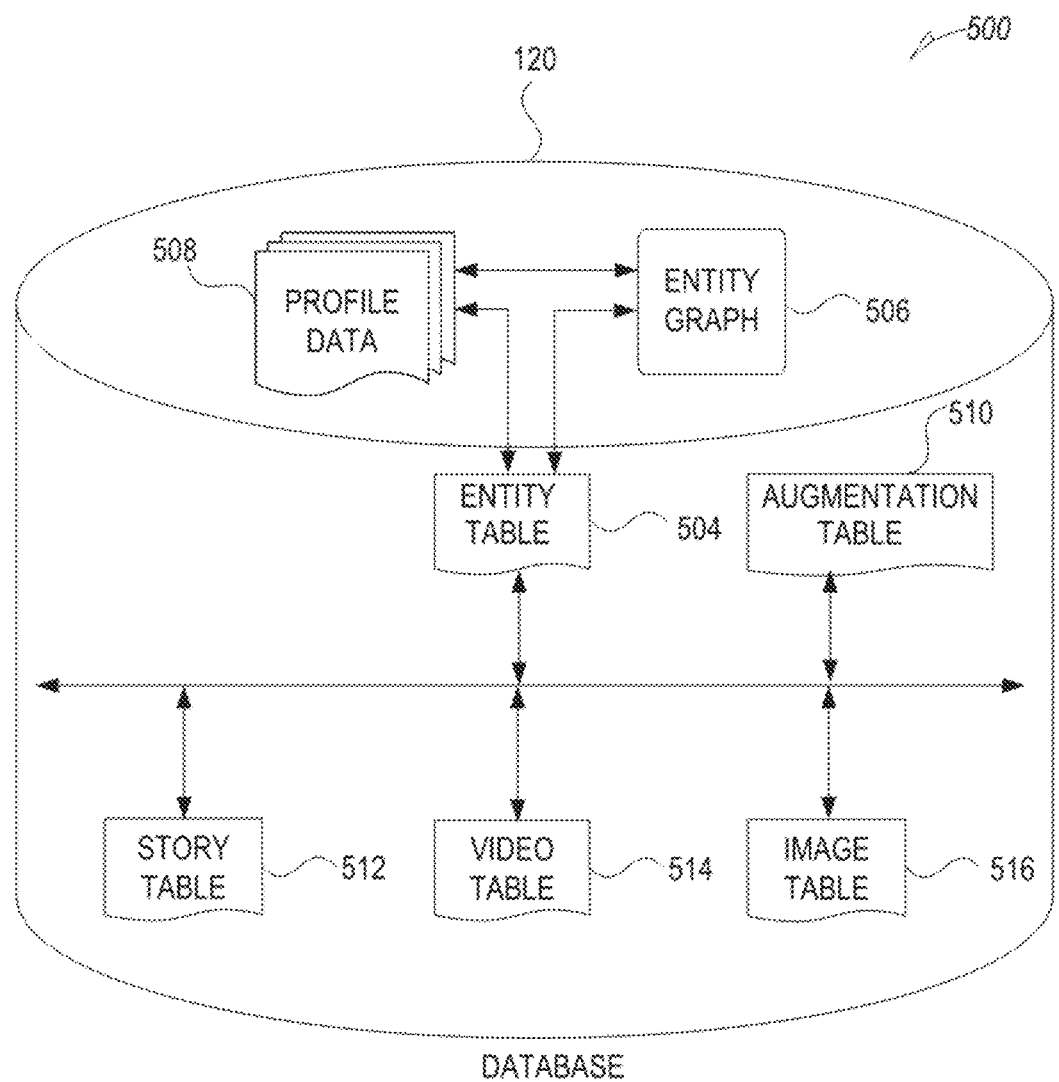
FIG. 5 is a diagrammatic representation of a data structure as maintained in the database, according to some example embodiments.

FIG. 5 is a diagrammatic representation of a data structure 500 as maintained in the database 120, in accordance with some examples. While the content of the database 120 is shown to comprise a number of tables, it will be appreciated that the data could be stored in other types of data structures (e.g., as an object-oriented database).

An entity table 504 stores entity data, and is linked (e.g., referentially) to an entity graph 506 and profile data 508. Entities for which records are maintained within the entity table 504 may include individuals, corporate entities, organizations, objects, places, events, and so forth. Regardless of entity type, any entity regarding which the presentation server system 108 stores data may be a recognized entity. Each entity is provided with a unique identifier, as well as an entity type identifier (not shown). The entity table 504 may associate various augmentations from the augmentation table 510 with various images and videos stored in the image table 516 and the video table 514.

The entity graph 506 stores information regarding relationships and associations between entities. Such relationships may be social, professional (e.g., work at a common corporation or organization) interested-based or activity-based, merely for example.

The profile data 508 stores multiple types of profile data about a particular entity. The profile data 508 may be selectively used and presented to other users of the volumetric content presentation system 100, based on privacy settings specified by a particular entity. Where the entity is an individual, the profile data 508 includes, for example, a user name, telephone number, address, settings (e.g., notification and privacy settings), as well as a user-selected avatar representation (or collection of such avatar representations).

The database 120 also stores augmentation data, such as overlays including AR content items and filters, in an augmentation table 510. The augmentation data is associated with and applied to videos (for which data is stored in a video table 514) and images (for which data is stored in an image table 516) including volumetric videos and images.

A story table 512 stores data regarding collections of content including associated image, video, or audio data that are compiled into a collection (e.g., a story or a gallery). The creation of a particular collection may be initiated by a particular user (e.g., each user for which a record is maintained in the entity table 504). A user may create a "personal story" in the form of a collection of content that has been created and sent/broadcast by that user. To this end, the user interface of the presentation client 104 may include an icon that is user-selectable to enable a sending user to add specific content to his or her personal story.

As mentioned above, the video table 514 stores video data that includes volumetric videos. Similarly, the image table 516 stores image data that that includes volumetric images.

Figure 6A:
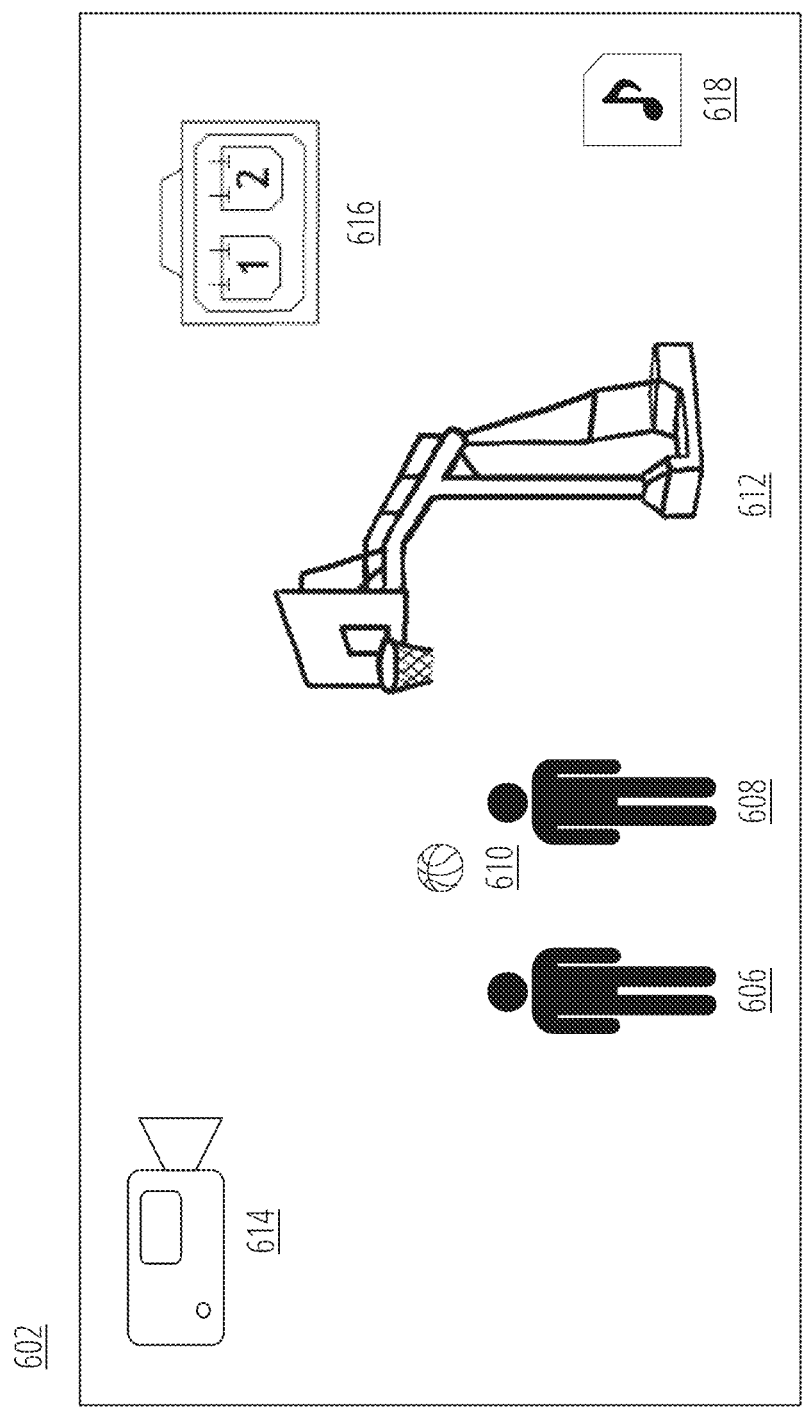
FIGS. 6A-6D are conceptual diagrams illustrating an example presentation of a volumetric video as part of a multi-perspective augmented reality experience, according to some example embodiments.

With reference to FIG. 6A an example volumetrically captured scene 602 from a volumetric video is shown. The volumetrically captured scene 602 includes volumetric representations of a real-world environment. In the example scene 602, two players 606 and 608 play basketball 610 together in a basketball court. The basketball court includes a basketball hoop 612. At least a portion of the volumetric video is based on video captured by a volumetric recorder 614 that includes the basketball court and the players 606 and 608. In some examples, either or both players 606 and 608 may wear a wearable device (e.g., the glasses 200). A camera (e.g., camera 216) of the wearable device may record a perspective of the player(s) occasionally or continuously before, during, or after the basketball game.

In some examples, a score board 616 may record a real-time score of the two players 606 and 608. For example, the score is one to two. Music 618 may be played in the scene 602. A conversation (in a form of, e.g., an audio signal) between the players 606 and 608 or by the players 606 and/or 608 may also be recorded and presented as part of the presentation of the volumetric video. The volumetric recorder 614 and/or the wearable devices of the two players 606 and 608 may record the music 618 played in background and the conversation between or by the two players.

Figure 6B:
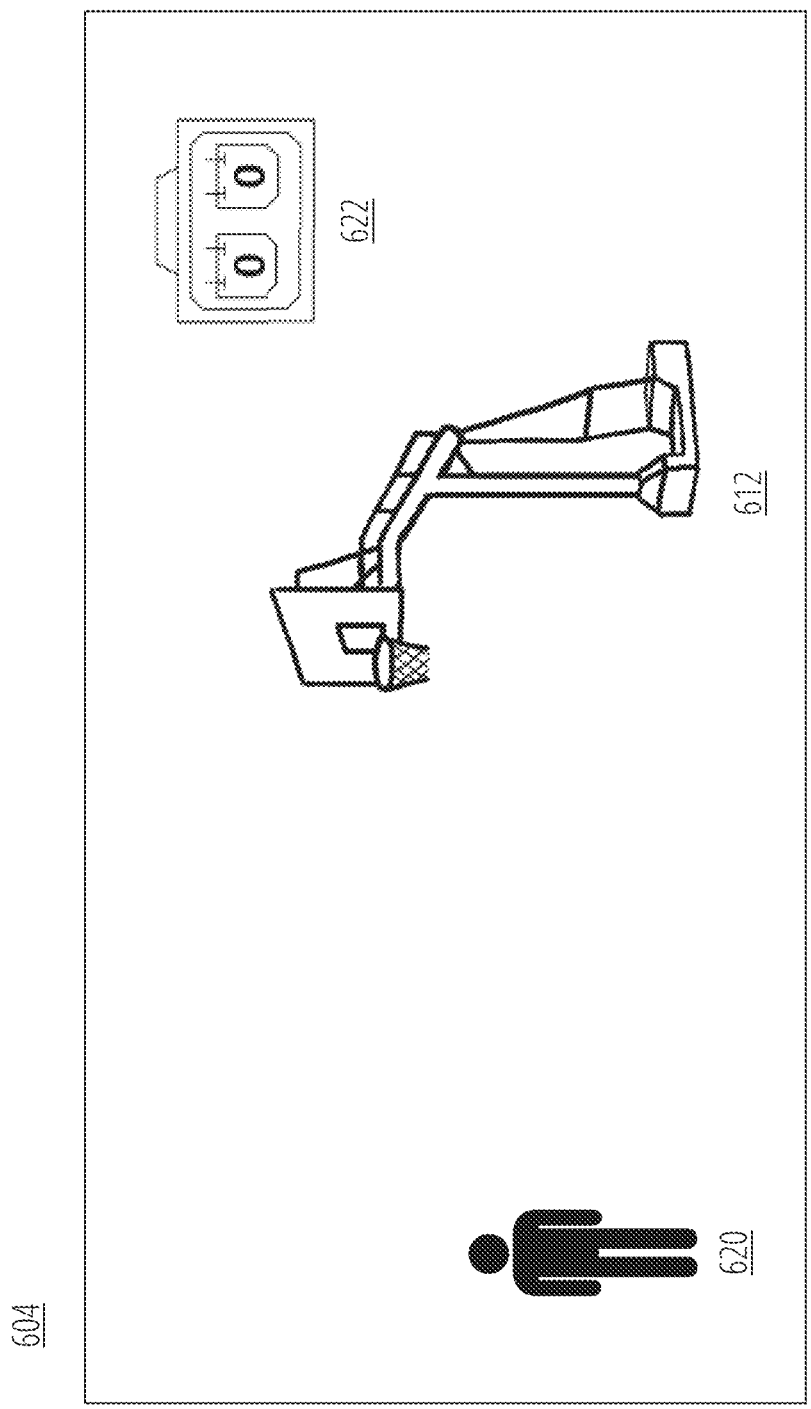

With reference to FIG. 6B, an example environment 604 in which a user 620 is located is shown. The user 620 may be the same as or different from the player 606 or the player 608. In some examples, the environment 604 may be at a same environment depicted in the example scene 602. In that case, the user 620 is visiting the same basketball court as in example scene 602 in FIG. 6A. Alternatively, the environment 604 may be at a different position from the example scene 602. For example, the user 620 may visit a different basketball court. In some examples, the environment 604 may be a virtual scene presented by an Augmented Reality (AR) or Virtual Reality (VR) device of the user 620 and the user may be at any place, not limited to a basketball court.

Assuming the user 620 is visiting the same basketball court as in example scene 602 in FIG. 6A, the example environment 604 may include the same basketball hoop 612. In some examples, a score board 622 is also included in the example environment 604; however, the scores on the score board 622 may be different from that on the score board 616. For example, the score is zero to zero.

Figure 6C:
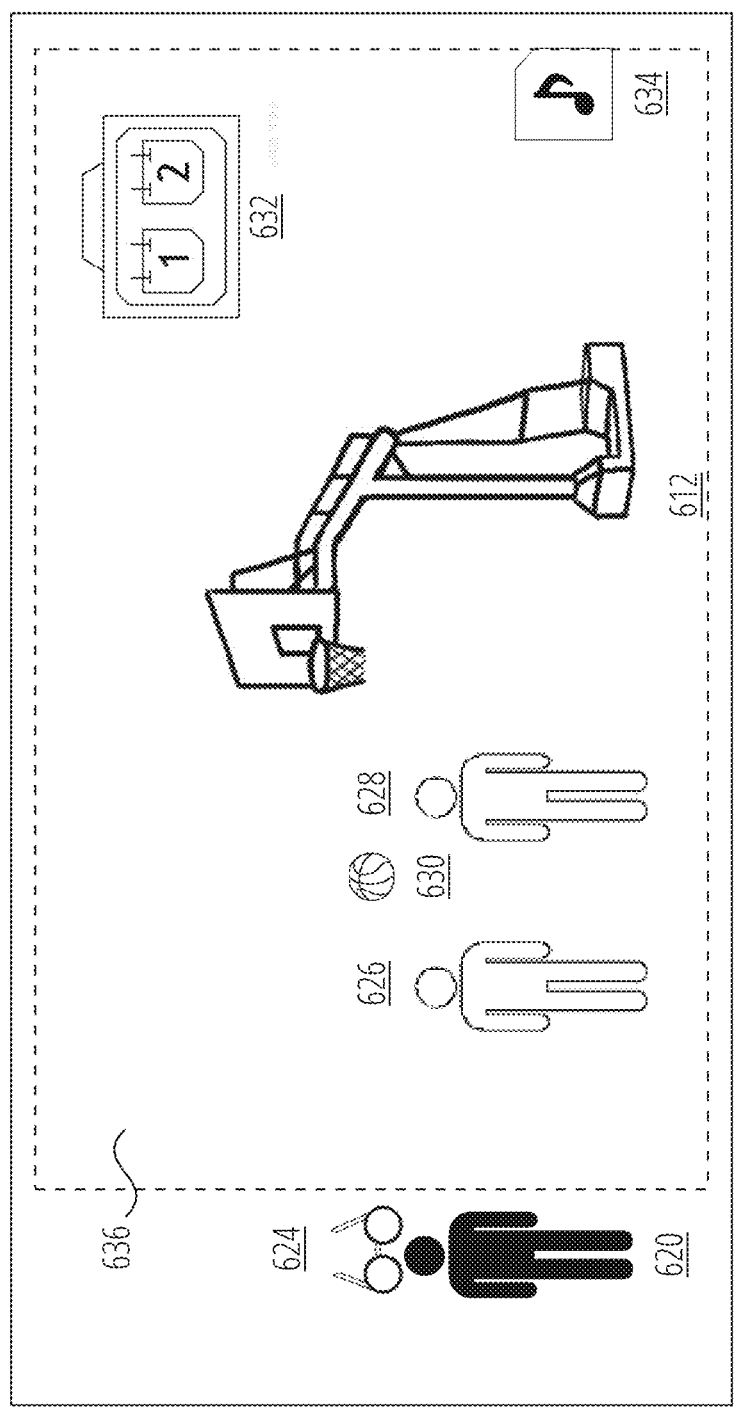

As shown in FIG. 6C, the user 620 may wear a wearable device 624. The wearable device 624 may be Augmented Reality (AR) glasses or Virtual Reality (VR) glasses. For example, the wearable device 624 may be glasses 200. A presentation 636 of the volumetric video may be provided to the user 620 by the wearable device 624. In some examples, the presentation 636 may correspond to the volumetric video of the basketball court captured by the volumetric recorder 614 in the example scene 602 in FIG. 6A. The presentation 636 may include a representation of two players 626 and 628 corresponding to the players 606 and 608, a representation of a basketball 630 corresponding to the basketball 610, and a representation of a score board 632 corresponding to the score board 616. In some examples, the representation of the two players 626 and 628 may be volumetric. In some examples, as part of the presentation of the volumetric video, the score board 632 may be overlaid on the score board 622 such that the score board 632 appears to have a score similar to that of the score board 616. For example, the "zero to zero" in the score board 622 is overlaid with "one to two" in the score board 616. For presentation of some volumetric videos, music 634 may be played. The music 634 may be the same as the music 618. If music (not shown in the figure) is played in the environment 604, the music will be replaced by the music 634/music 618. For example, the wearable device 624 may send a control signal to a speaker (not shown in the figure) to play or switch to the music 634. The speaker may be mounted on the wearable device 624 or installed on the basketball court.

Figure 6D:
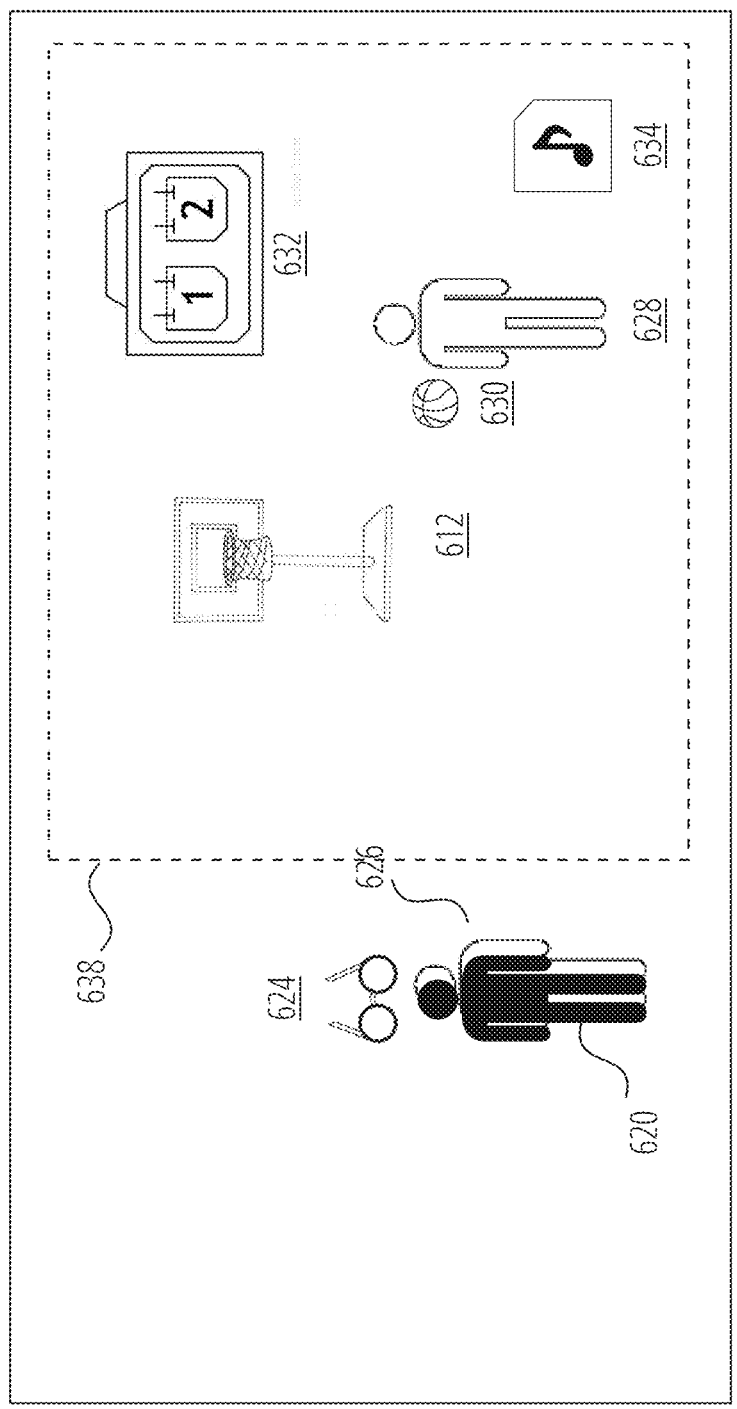

FIG. 6D illustrates presentation of a recorded perspective of a first user of the three-dimensional space when a second user enters a volumetric body of the first user. As discussed above in FIG. 6C, the presentation 636 may include a volumetric representation of the player 626. When the user 620 "enters" the representation of the player 626, the wearable device 624 may switch from the presentation 636 to the presentation 638. The presentation 638 may correspond to a perspective of the player 606 in the scene 602 in FIG. 6A. The presentation 638 may include the basketball hoop 612 in a perspective of the player 606 which is a front view of the basketball hoop 612. The presentation 638 may also include a player 628 corresponding to the player 608. In some examples, the presentation 638 may include the same score board 632, and the same music 634 may be played in or with the presentation 638. Detailed descriptions regarding how to determine whether the user 620 enters the representation of the player 626 may be be found elsewhere in the present disclosure, for example, in FIG. 8 and the corresponding descriptions.

In some examples, the user 620 may be the same as the player 608. By entering the volumetric representation of the player 606, the user 620 (player 608) may have the chance to view himself or herself in the perspective of the other player. In some examples, the players 606 and 608 may come to the basketball court together and view each or both perspectives together. The player 606 and the player 608 may also view a perspective of the volumetric recorder 614.

It should be noted that FIGS. 6A-6D are exemplary. Methods and systems of the present application may be used in other scenarios in a same or similar manner and the examples in FIGS. 6A-6D are not limiting.

Figure 7:
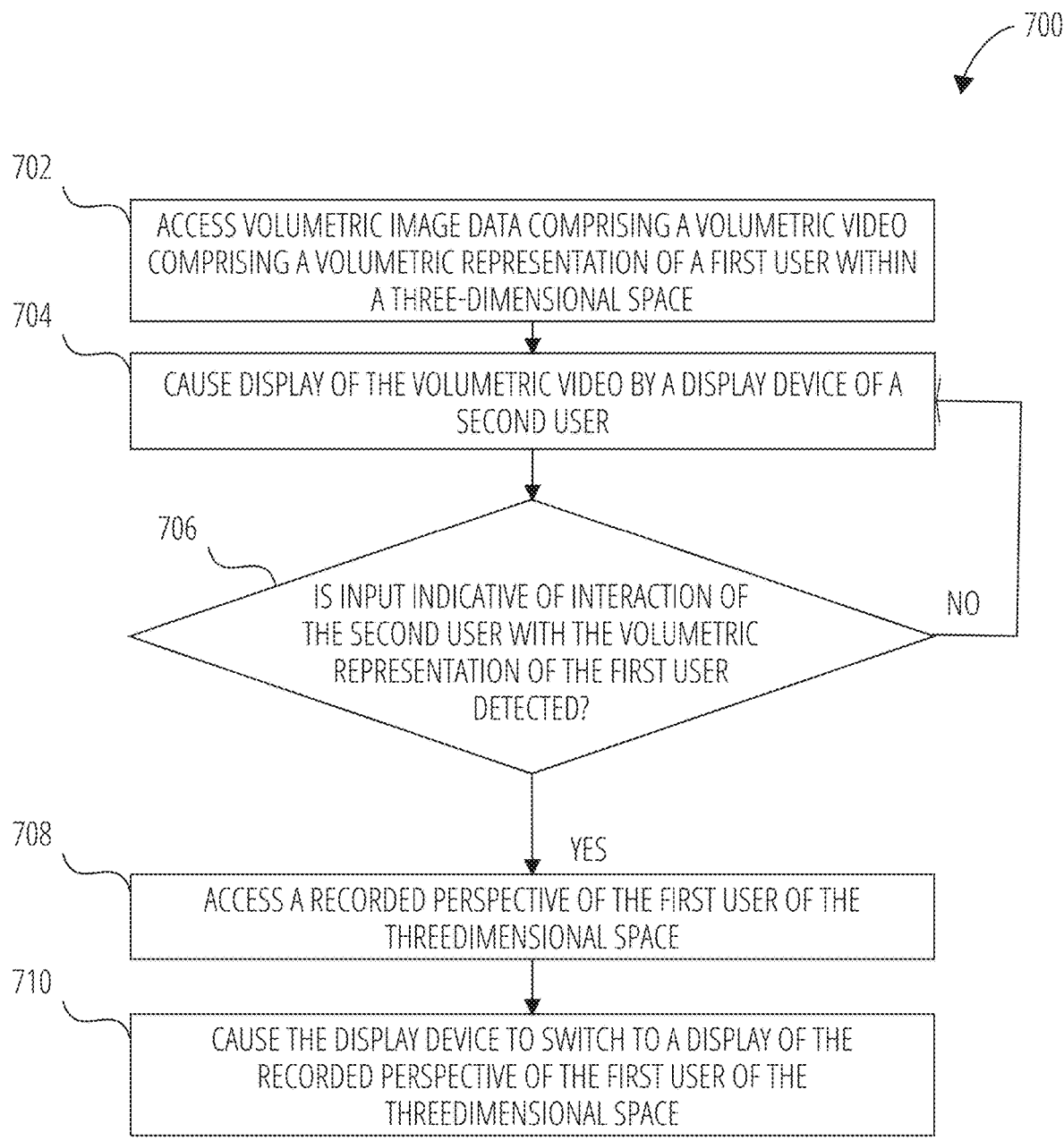
FIG. 7 is a flowchart illustrating an example method for providing a multi-perspective experience by entering a volumetric AR human body, according to some example embodiments.

FIG. 7 is a flowchart illustrating an example method 700 for providing a multi-perspective experience by entering a volumetric AR human body in accordance with some examples. The method 700 may be embodied in computer-readable instructions for execution by one or more processors such that the operations of the method 700 may be performed in part or in whole by the functional components of the volumetric content presentation system 100; accordingly, the method 700 is described below by way of example with reference thereto. However, it shall be appreciated that at least some of the operations of the method 700 may be deployed on various other hardware configurations than the volumetric content presentation system 100.

In operation 702, the volumetric content presentation system 100 accesses volumetric content. The volumetric content includes a volumetric video including a volumetric representation of a first user within a three-dimensional space. The volumetric video may be based on video captured by a wearable device (e.g., the glasses 200) of a first user, one or more volumetric recorder (e.g., volumetric recorder 614), or various combinations thereof. The captured volumetric video may be stored in and later accessed from a storage or a database (e.g., database 120). An example volumetric video may be found in FIG. 6A. The three-dimensional space may be a football field, a basketball court, a baseball field, a music stadium, or any other indoor or outdoor scenarios. An example three-dimensional space may be found in FIG. 6A as a basketball court. An example first user may be found in FIG. 6A as the first player 606.

In operation 704, the volumetric content presentation system 100 causes presentation of the volumetric video by a display device of a second user. The presentation of the volumetric video may include a presentation of the volumetric representation of the first user within the three-dimensional space. The display device may be a wearable device (e.g., glasses 200, wearable device 624) or a part thereof. The second user may be the same or different from the first user. An example second user may be found in FIG. 6C as the user 620.

In determination operation 706, volumetric content presentation system 100 determines whether an input is indicative of an interaction of the second user with the volumetric representation of the first user within the presentation of the volumetric video detected. If the determination is yes, the method 700 may proceed to operation 708; otherwise, the method 700 may proceed back to operation 704. In some examples, the input indicative of the interaction of the second user with the volumetric representation of the first user may include a detection that the second user enters the volumetric representation of the first user. Detailed description regarding the determination on whether the second user enters the volumetric representation of the first user may be found elsewhere in the present disclosure, for example, in method 800 in FIG. 8. In some examples, the interaction of the second user with the volumetric representation may include other types of interactions, including but not limited to the second person touching, holding, or talking to the volumetric representation of the first user or a part thereof.

In an example, the three-dimensional space corresponds to a real-world location and the display device is worn by the second user at the same real-world location. The presentation of the volumetric video includes a presentation of the volumetric representation of the first user overlaid on the real-world location at a position in the real-world location corresponding to the position of the first user in the real-world location during capture of the volumetric video. In this example, the presentation of the volumetric video includes a presentation of the volumetric representation of the first user overlaid on one or more elements of the real-world location.

In another example, the three-dimensional space corresponds to a first real-world location and the display device is worn by the second user at a second (different) real-world location. In this example, the presentation of the volumetric video includes a presentation of the volumetric representation of the first user at a position in the three-dimensional space corresponding to a position of the first user in the real-world location during capture of the volumetric video. The presentation of the volumetric video includes a presentation of one or more AR content items overlaid on one or more elements of the real-world location.

In operation 708, the volumetric content presentation system 100 accesses a recorded perspective of the first user of the three-dimensional space. The perspective of the first user of the three-dimensional space may be recorded by a capture device (e.g., camera 216 of glasses 200). The perspective of the first user refers to the view of the first user of the three-dimensional space. The recorded perspective of the first user may include an audio signal including audio provided by the first user during capture of the volumetric video. The audio signal may also include conversation between the first user and another user (e.g., the second user or a third user).

In operation 710, the volumetric content presentation system 100 causes the display device to switch to a presentation of the recorded perspective of the first user of the three-dimensional space. The presentation of the recorded perspective may include playing a video of the recorded perspective of the first user to the display device of the second user. Alternatively, or additionally, the display device may use AR or VR technology to overlay a real-world environment with the recorded perspective of the first user. In some examples, the volumetric video may further include a volumetric representation of the second user and the recorded perspective of the first user includes the volumetric representation of the second user. The first user may wear a similar display device and the method 700 may similarly be performed by the display device of the first user. In such a way, the first user and the second user may freely view a recorded perspective of themselves or each other by interacting with volumetric representations of themselves. Alternatively, or additionally, a third user may view a recorded perspective of the first user and/or the second user by interacting with a volumetric representation of the first user and/or the second user.

Figure 8:
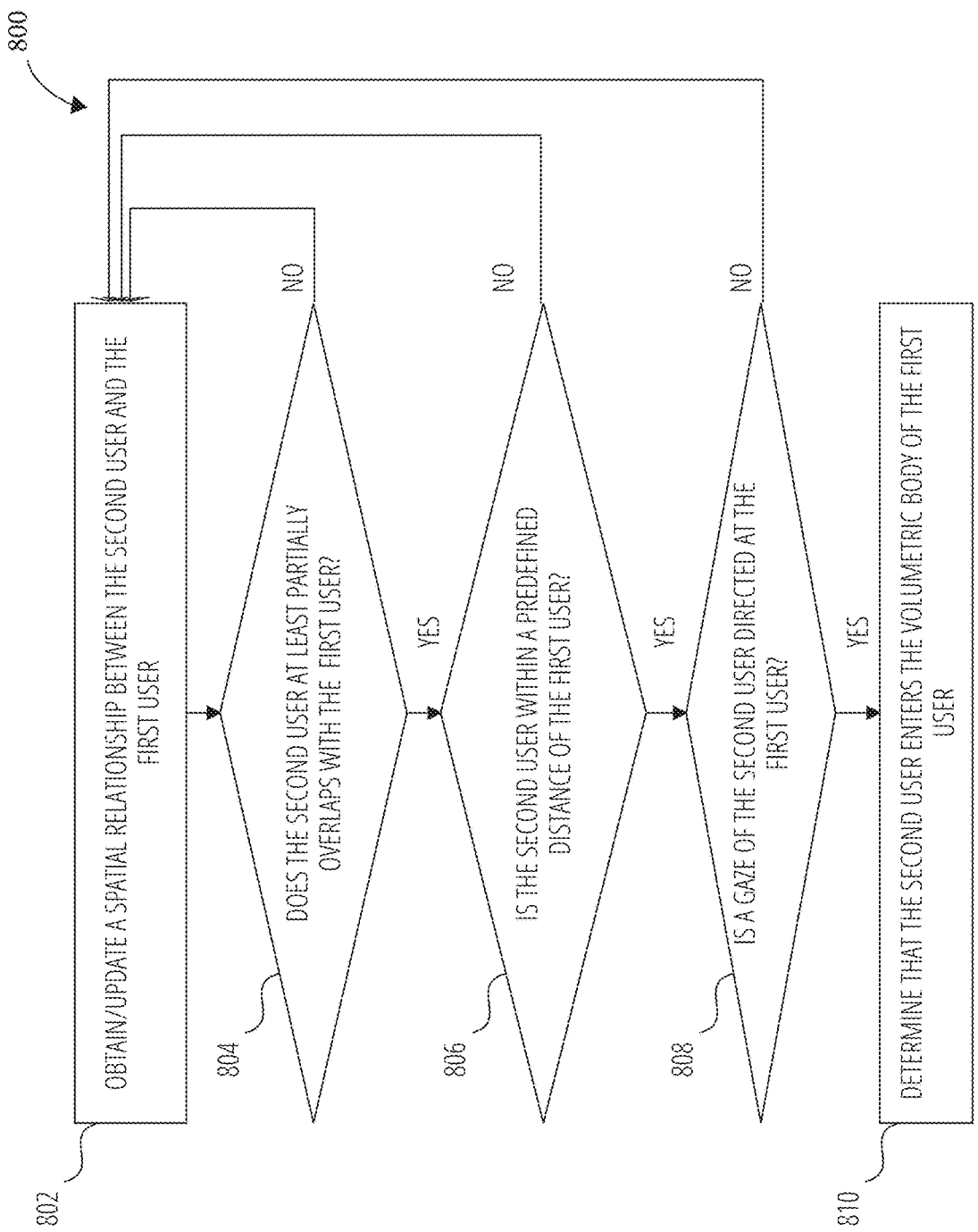
FIG. 8 is a flowchart illustrating an example method for determining whether a second user enters the volumetric body of a first user, according to some example embodiments.

FIG. 8 is a flowchart illustrating an example method 800 for determining whether a second user enters the volumetric body of a first user, in accordance with some examples. The method 800 may be embodied in computer-readable instructions for execution by one or more processors such that the operations of the method 800 may be performed in part or in whole by the functional components of the volumetric content presentation system 100; accordingly, the method 800 is described below by way of example with reference thereto. However, it shall be appreciated that at least some of the operations of the method 800 may be deployed on various other hardware configurations than the volumetric content presentation system 100.

For some embodiments, the method 800 may be an exemplary process corresponding to the determination operation 706 of process 700 in FIG. 7. For example, the result of the method 800 may be a determination that a second user enters the volumetric body (or volumetric representation) of the first user. Such determination corresponds to a detection of an input indicative of the interaction of the second user with the volumetric representation of the first user within the presentation of the volumetric video as described in operation 706 of process 700 in FIG. 7.

In operation 802, the volumetric content presentation system 100 determines a spatial relationship between the real-life volumetric body of the second user and the volumetric representation of the first user. In some examples, an initial spatial relationship between the real-life volumetric body of the second user and the volumetric representation of the first user may be determined based on initial spatial postures (e.g., positions, volumes, and orientations) of the real-life volumetric body of the second user and of the volumetric representation of the first user. The operation 802 may also include continuously or periodically updating the initial spatial relationship based on the initial spatial postures of the volumetric representation of the first user and an updated spatial posture of the real-life volumetric body of the second user. An exemplary real-life volumetric body of the second user may be found in FIG. 6D as user 620. An exemplary volumetric representation of the first user may be found in FIG. 6D as a representation of a player 626.

In determination operation 804, the volumetric content presentation system 100 determines whether a real-life volumetric body of the second user at least partially overlaps with the volumetric representation of the first user. If the determination is yes, the method 800 may proceed to determination operation 806; otherwise, the method 800 may proceed back to operation 802. In some examples, a volume of the real-life volumetric body of the second user and a volume of the volumetric representation of the first user may be obtained. The determination operation 804 may include determining whether there is an overlap between the two volumes. In some examples, a "partial overlap" requires any overlap more than none. Alternatively, a minimum overlap may be required. The minimum overlap may be 0.1%, 0.2%, 0.5%, 1%, 2%, 5%, or the like. The determination operation 804 may only determine that the real-life volumetric body of the second user at least partially overlaps with the volumetric representation of the first user when their overlap is greater than or equal to the minimum overlap.

In determination operation 806, the volumetric content presentation system 100 determines whether the real-life volumetric body of the second user is within a predefined distance of the volumetric representation of the first user. If the determination is yes, the method 800 may proceed to determination operation 808; otherwise, the method 800 may proceed back to operation 802. In some examples, a distance may be measured from a middle point (or a center of gravity) of the real-life volumetric body of the second user to a middle point (or a center of gravity) of the volumetric representation of the first user. For example, if the second user's hand touches the volumetric representation of the first user while most of the second user's body is distant from the volumetric representation of the first user (e.g., the distance between their middle points being greater than the predefined distance), the determination may be "no" and the method 800 may proceed back to operation 802. The spatial relationship is updated and the method 800 is performed again. Alternatively, a distance may be measured from a part (e.g., a head, a neck, a chest, an abdomen, an arm, a leg, a foot) of the real-life volumetric body of the second user to the same part of the volumetric representation of the first user. The predefined distance may be 1 millimeter (mm), 2 mm, 5 mm, 1 centimeter (cm), 2 cm, 5 cm, 1 decimeter (dm), 2 dm, 5 dm, or the like.

In determination operation 808, the volumetric content presentation system 100 determines whether a gaze of the second user is directed at the volumetric representation of the first user. If the determination is yes, the method 800 may proceed to operation 810; otherwise, the method 800 may proceed back to operation 802. In some examples, the determination operation 808 may include determining whether the gaze of the second user passes the volumetric representation of the first user. The gaze of the second user may be determined based on the orientation of the eyes or head of the second user. In some examples, the determination operation 808 may include measuring an angle or a distance between the gaze of the second user and a point or a part of the volumetric representation of the first user. For example, if the second user's gaze directs to an opened arm of the first user and not the torso of the second user, the determination may be "no" and the method 800 may proceed back to operation 802. The spatial relationship is updated and the method 800 is performed again.

In operation 810, the volumetric content presentation system 100 determines that the second user enters the volumetric body of the first user. It should be noted that the determination operations 804, 806, and 808 may be performed in any order. Also, any of the determination operations 804, 806, and 808 may be omitted. In some examples, the method 800 may be modified such that the second user is determined to enter the volumetric body of the first user when any of the determination operations 804, 806, and 808 is "yes." In some examples, a spatial relationship may be called a target spatial relationship when all the determination operations 804, 806, and 808 in method 800 are yes, or any of the determination operations 804, 806, and 808 in modified method 800 is yes. As mentioned above, the determination that the second user enters the volumetric body of the first user in operation 810 may be an example corresponding to an interaction of the second user with the volumetric representation of the first user in operation 706 of process 700 in FIG. 7.

Software Architecture

Figure 9:
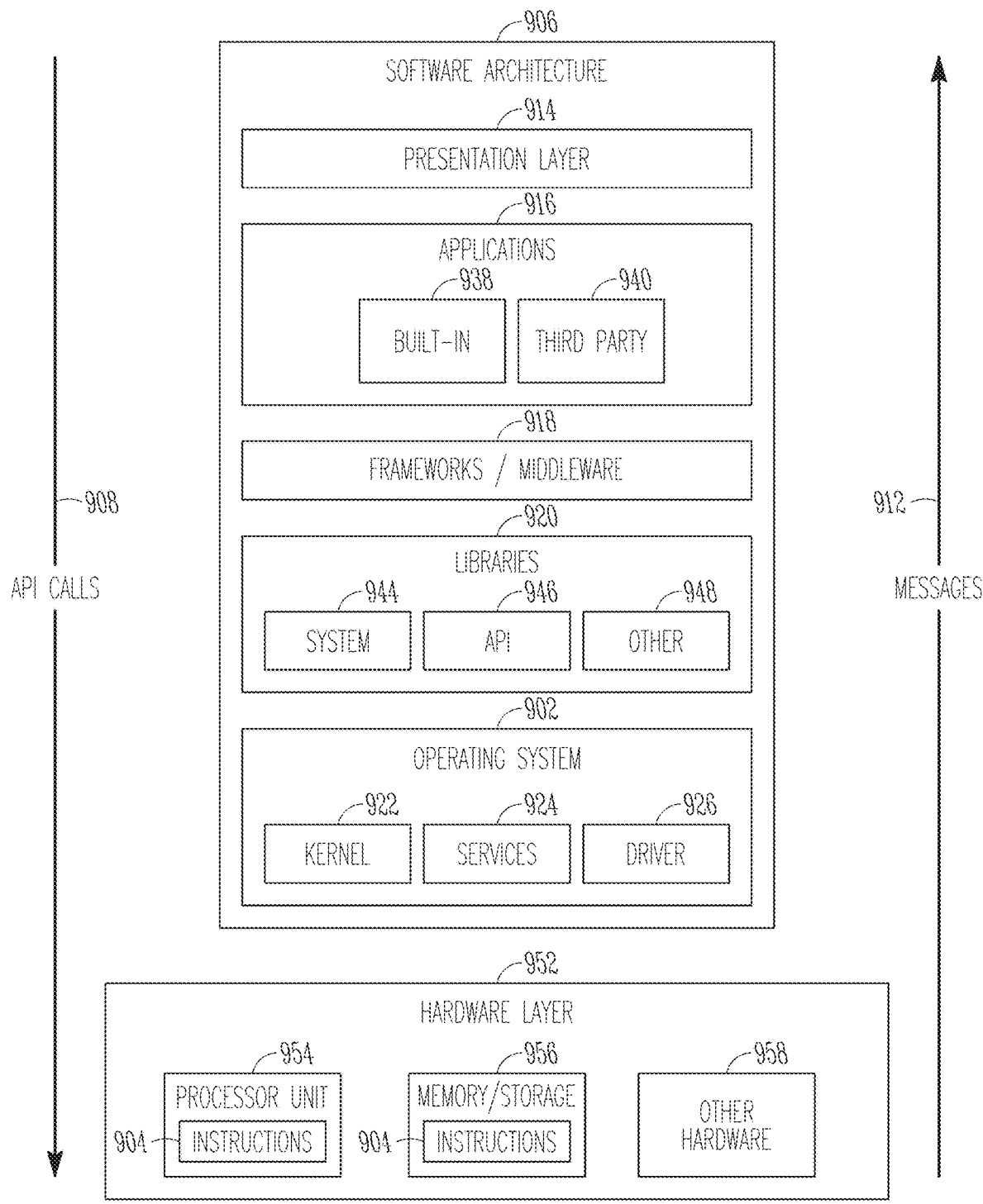
FIG. 9 is a block diagram illustrating an example software architecture, according to some example embodiments.

FIG. 9 is a block diagram illustrating an example software architecture 906, which may be used in conjunction with various hardware architectures herein described. FIG. 9 is a non-limiting example of a software architecture, and it will be appreciated that many other architectures may be implemented to facilitate the functionality described herein. The software architecture 906 may execute on hardware such as a machine 1000 of FIG. 10 that includes, among other things, processors 1004, memory/storage 1006, and I/O components 1018. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes memory and/or storage modules 956, which also have the executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive a response to the API calls 908 as messages 912. The layers illustrated are representative in nature and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide various GUI functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create user interfaces to interact with users of the system. Alternatively, or additionally, in some systems interactions with a user may occur through a presentation layer, such as the presentation layer 914. In these systems, the application/component "logic" can be separated from the aspects of the application/component that interact with a user.

Figure 10:
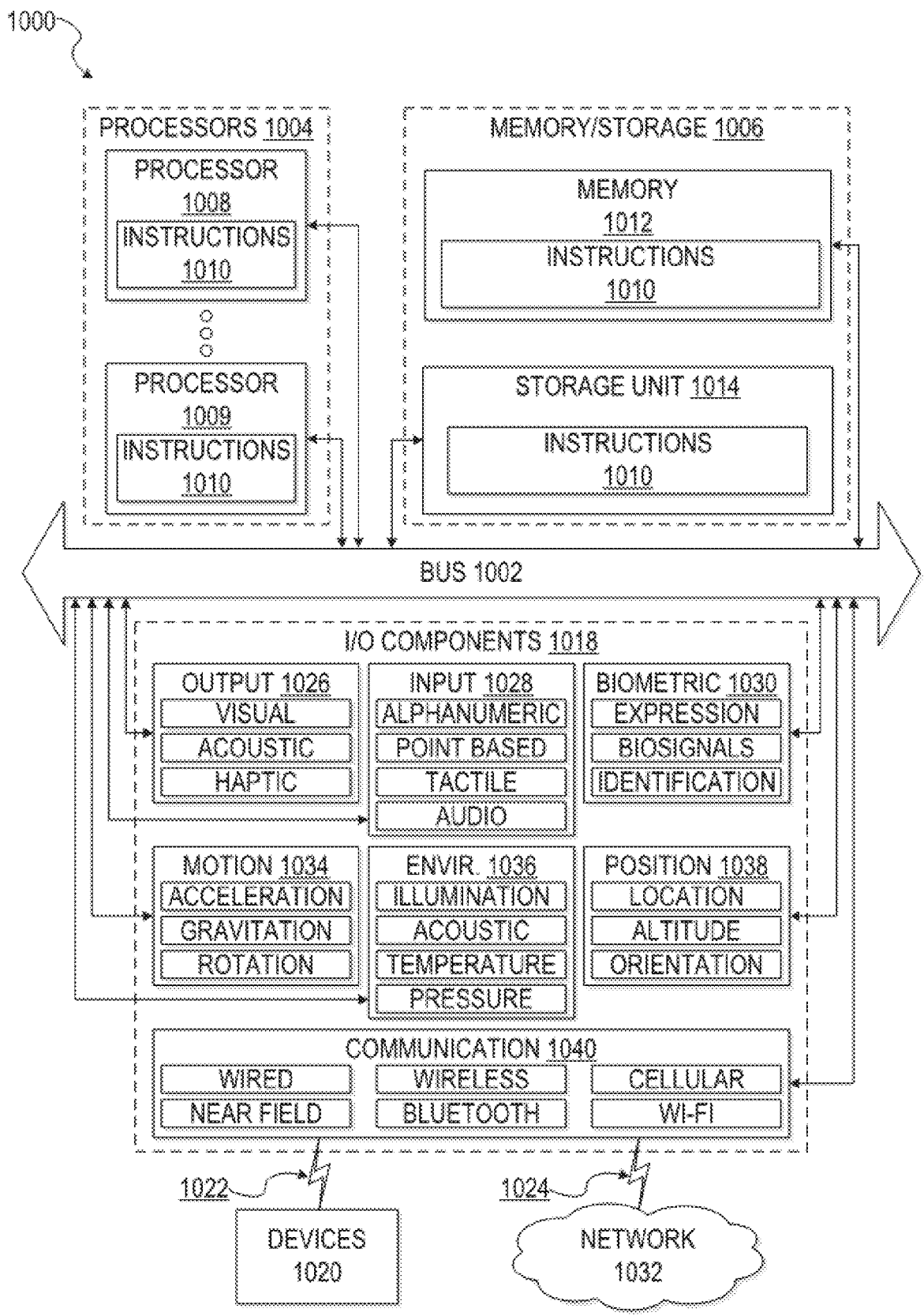
FIG. 10 is a block diagram illustrating components of a machine, according to some example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1008 and a processor 1009 that may execute the instructions 1010. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1012, such as a main memory, or other memory storage, and a storage unit 1014, both accessible to the processors 1004 such as via the bus 1002. The storage unit 1014 and memory 1012 store the instructions 1010 embodying any one or more of the methodologies or functions described herein. The instructions 1010 may also reside, completely or partially, within the memory 1012, within the storage unit 1014, within at least one of the processors 1004 (e.g., within the processor's cache memory), or any suitable combination thereof, during execution thereof by the machine 1000. Accordingly, the memory 1012, the storage unit 1014, and the memory of the processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion, and the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1018 may include biometric components 1030, motion components 1034, environment components 1036, or position components 1038, among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1038 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via a coupling 1024 and a coupling 1022, respectively. For example, the communication components 1040 may include a network interface component or other suitable device to interface with the network 1032. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:
accessing a first volumetric video of a three-dimensional space comprising a volumetric representation of a first user within the three-dimensional space;
accessing a second volumetric video of the three-dimensional space, the second volumetric video being recorded at a perspective of the first user within the three-dimensional space;
causing a display device of a second user to present the first volumetric video of the three-dimensional space comprising the volumetric representation of the first user to the second user;
detecting that a real-life body of the second user interacts with the volumetric representation of the first user presented in the first volumetric video, wherein the interacting comprises that the real-life body of the second user at least partially overlaps with the volumetric representation of the first user; and
in response to detecting that the real-life body of the second user interacts with the volumetric representation of the first user presented in the first volumetric video,
causing the display device to switch to present the second volumetric video to the second user at the perspective of the first user.

2. The method of claim 1, wherein detecting that a real-life body of the second user interacts with the volumetric representation of the first user presented in the first volumetric video further comprises:
determining a gaze of the second user is directed at the volumetric representation of the first user.

3. The method of claim 1, wherein the recorded perspective of the first user further comprises an audio signal comprising audio provided by the first user during capture of the first volumetric video or the second volumetric video, wherein the causing presentation of the second volumetric video at the perspective of the first user comprises causing presentation of the audio signal.

4. The method of claim 3, wherein the audio signal comprises a conversation between the first user and the second user during the capture of the first volumetric video or the second volumetric video.

5. The method of claim 1, wherein:
the three-dimensional space corresponds to a real-world location;
the display device is worn by the second user at the real-world location; and
the presentation of the first volumetric video comprises a presentation of the volumetric representation of the first user overlaid on the real-world location at a position in the real-world location corresponding to a position of the first user in the real-world location during capture of the first volumetric video or the second volumetric video.

6. The method of claim 1, wherein:
the three-dimensional space corresponds to a first real-world location;
the display device is worn by the second user at a second real-world location; and
the presentation of the first volumetric video comprises a presentation of the volumetric representation of the first user at a position related to the second real-world location corresponding to a position of the first user in the real-world location during capture of the volumetric video.

7. The method of claim 6, wherein causing presentation of the first volumetric video by the display device comprises causing presentation of one or more AR content items overlaid on one or more elements of the real-world location.

8. The method of claim 1, wherein:
the three-dimensional space corresponds to a real-world location;
the display device is worn by the second user at the real-world location; and
causing presentation of the first volumetric video by the display device comprises causing presentation of the volumetric representation of the first user overlaid on one or more elements of the real-world location.

9. The method of claim 1, wherein:
the first volumetric video further comprises a volumetric representation of the second user; and
the second volumetric video at the perspective of the first user comprises the volumetric representation of the second user.

10. The method of claim 1, wherein the three-dimensional space comprises the second user and the first volumetric video of the three-dimensional space comprises a volumetric representation of the second user within the three-dimensional space, the method further comprising:
accessing a third volumetric video of the three-dimensional space, the third volumetric video being recorded at a perspective of the second user within the three-dimensional space;
detecting that a real-life body of the first user interacts with the volumetric representation of the second user presented in the first volumetric video, wherein the interacting comprises that the real-life body of the first user at least partially overlaps with the volumetric representation of the second user: and
in response to detecting that the real-life body of the first user interacts with the volumetric representation of the second user,
causing the display device of the first user to switch to present the third volumetric video to the first user at the recorded perspective of the second user.

11. The method of claim 1, wherein detecting that a real-life body of the second user interacts with the volumetric representation of the first user presented in the first volumetric video comprises:

determining an initial spatial posture of the volumetric representation of the first user and an initial spatial posture of the real-life body of the second user; and continuously or periodically updating the initial-spatial posture of the real-life body of the second user, until detecting that the real-life body of the second user interacts with the volumetric representation of the first user presented in the first volumetric video.

12. The method of claim 1, wherein the display device is an Augmented Reality (AR) display device.

13. A computing apparatus comprising:

a processor; and a memory storing instructions that, when executed by the processor, configure the apparatus to perform operations comprising:

accessing a first volumetric video of a three-dimensional space comprising a volumetric representation of a first user within the three-dimensional space;

accessing a second volumetric video of the three-dimensional space, the second volumetric video being recorded at a perspective of the first user within the three-dimensional space;

causing a display device of a second user to present the first volumetric video of the three-dimensional space comprising the volumetric representation of the first user to the second user;

detecting that a real-life body of the second user interacts with the volumetric representation of the first user presented in the first volumetric video, wherein the interacting comprises that the real-life body of the second user at least partially overlaps with the volumetric representation of the first user; and in response to detecting that the real-life body of the second user interacts with the volumetric representation of the first user presented in the first volumetric video, causing the display device to switch to present the second volumetric video to the second user at the perspective of the first user.

14. The computing apparatus of claim 13, wherein to detect that a real-life body of the second user interacts with the volumetric representation of the first user presented in the first volumetric video, the instructions further configure the apparatus to perform operations comprising:

determining a gaze of the second user is directed at the volumetric representation of the first user.

15. The computing apparatus of claim 13, wherein:

the three-dimensional space corresponds to a real-world location;

the display device is worn by the second user at the real-world location; and the presentation of the first volumetric video comprises a presentation of the volumetric representation of the first user overlaid on the real-world location at a position in the real-world location corresponding to a position of the first user in the real-world location during capture of the first volumetric video or the second volumetric video.

16. The computing apparatus of claim 13, wherein:

the three-dimensional space corresponds to a first real-world location;

the display device is worn by the second user at a second real-world location; and the presentation of the first volumetric video comprises a presentation of the volumetric representation of the first user at a position related to the second real-world location corresponding to a position of the first user in the real-world location during capture of the volumetric video.

17. The computing apparatus of claim 16, wherein cause presentation of the first volumetric video by the display device comprises causing presentation of one or more AR content items overlaid on one or more elements of the real-world location.

18. The computing apparatus of claim 13, wherein:

the three-dimensional space corresponds to a real-world location;

the display device is worn by the second user at the real-world location; and cause presentation of the first volumetric video by the display device comprises causing presentation of the volumetric representation of the first user overlaid on one or more elements of the real-world location.

19. The computing apparatus of claim 13, wherein:

the first volumetric video further comprises a volumetric representation of the second user; and the second volumetric video at the perspective of the first user comprises the volumetric representation of the second user.

20. A non-transitory computer-readable storage medium, the computer-readable storage medium including instructions that when executed by a computer, cause the computer to perform operations comprising:

accessing a first volumetric video of a three-dimensional space comprising a volumetric representation of a first user within the three-dimensional space;

accessing a second volumetric video of the three-dimensional space, the second volumetric video being recorded at a perspective of the first user within three dimensional space:

causing a display device of a second user to present the first volumetric video of the three-dimensional space comprising the volumetric representation of the first user to the second user;

detecting that a real-life body of the second user interacts with the volumetric representation of the first user presented in the first volumetric video, wherein the interacting comprises that the real-life body of the second user at least partially overlaps with the volumetric representation of the first user, and in response to detecting that the real-life body of the second user interacts with the volumetric representation of the first user presented in the first volumetric video, causing the display device to switch to present the second volumetric video to the second user at the perspective of the first user.

\* \* \* \* \*